US010805248B2

(12) United States Patent
Luo et al.

(10) Patent No.: US 10,805,248 B2
(45) Date of Patent: Oct. 13, 2020

(54) INSTANT MESSAGING METHOD AND APPARATUS FOR SELECTING MOTION FOR A TARGET VIRTUAL ROLE

(71) Applicant: TENCENT TECHNOLOGY (SHENZHEN) COMPANY LIMITED, Shenzhen (CN)

(72) Inventors: Jun Luo, Shenzhen (CN); Kaiyu Mao, Shenzhen (CN); Meiyun Han, Shenzhen (CN); Qilin Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 187 days.

(21) Appl. No.: 15/963,957

(22) Filed: Apr. 26, 2018

(65) Prior Publication Data

US 2018/0248824 A1    Aug. 30, 2018

Related U.S. Application Data

(63) Continuation of application No. PCT/CN2017/084142, filed on May 12, 2017.

(30) Foreign Application Priority Data

May 12, 2016 (CN) .......................... 2016 1 0321679

(51) Int. Cl.
H04L 12/58 (2006.01)
H04M 1/725 (2006.01)
(Continued)

(52) U.S. Cl.
CPC ............ *H04L 51/10* (2013.01); *G06N 3/006* (2013.01); *H04L 29/06034* (2013.01);
(Continued)

(58) Field of Classification Search
CPC ... H04L 29/06034; H04L 51/10; H04L 51/04; A63F 2300/5553; G06N 3/006; H04M 1/72544
See application file for complete search history.

(56) References Cited

U.S. PATENT DOCUMENTS 5,880,731 A * 3/1999 Liles ..................... G06F 3/0481
345/473
5,884,029 A * 3/1999 Brush, II ................ G06F 3/011
709/202
(Continued)

FOREIGN PATENT DOCUMENTS

CN          101364957         2/2009
CN          101931621         12/2010
(Continued)

OTHER PUBLICATIONS

Bitstrips, Inc. "Your Own Personal Emoji by Bitstrips", <bitmoji.org>, publicly posted May 1, 2016, retrieved from archive.org, 3 pages. (Year: 2016).*
(Continued)

Primary Examiner — George C Neurauter, Jr.
(74) Attorney, Agent, or Firm — Oblon, McClelland, Maier & Neustadt, L.L.P.

(57) ABSTRACT

An instant messaging method is provided. A motion display request is received from a first client. The motion display request includes an identifier of a target virtual role and an identifier of a target motion data set. The identifier of the target motion data set is indicated by a motion display instruction received by the first client. The target virtual role corresponds to a target user and the target user is at least one user of a plurality of instant messaging users. Further, the first client is a client to which a certain user in the instant messaging users logs in. The target motion data set is obtained according to the identifier of the target motion data (Continued)

set. The target virtual role is obtained according to the identifier of the target virtual role. The target motion data set and the target virtual role are sent to at least one client of a plurality of designated clients corresponding to the instant messaging users. The at least one client of the designated clients displays the target virtual role based on the target motion data set.

20 Claims, 11 Drawing Sheets

(51) Int. Cl.
*H04L 29/06* (2006.01)
*G06N 3/00* (2006.01)

(52) U.S. Cl.
CPC ........ *H04L 51/04* (2013.01); *H04M 1/72544* (2013.01); *A63F 2300/5553* (2013.01)

(56) References Cited

U.S. PATENT DOCUMENTS

| | | | | |
|---|---|---|---|---|
| 6,535,215 | B1* | 3/2003 | DeWitt | G06T 13/40 345/473 |
| 6,937,950 | B2* | 8/2005 | Cragun | G06Q 10/109 345/473 |
| 7,249,139 | B2* | 7/2007 | Chuah | G06Q 30/06 |
| 7,484,176 | B2* | 1/2009 | Blattner | G06T 13/40 715/758 |
| 7,636,755 | B2* | 12/2009 | Blattner | H04L 12/1822 709/206 |
| 8,108,774 | B2* | 1/2012 | Finn | A63F 13/12 715/706 |
| 8,402,378 | B2* | 3/2013 | Blattner | H04L 51/046 715/758 |
| 8,775,526 | B2* | 7/2014 | Lorch | H04M 1/7253 455/556.1 |
| 9,425,974 | B2* | 8/2016 | Tucker | H04L 12/1827 |
| 9,483,859 | B2* | 11/2016 | Blattner | H04L 51/046 |
| 9,628,416 | B2* | 4/2017 | Henderson | H04L 51/043 |
| 9,807,130 | B2* | 10/2017 | Blattner | H04L 12/1822 |
| 9,842,164 | B2* | 12/2017 | Lee | G06Q 10/10 |
| 10,022,631 | B2* | 7/2018 | Nims | A63F 13/65 |
| 10,116,598 | B2* | 10/2018 | Tucker | H04L 51/10 |
| 10,169,897 | B1* | 1/2019 | Geiger | H04L 29/06176 |
| 10,210,002 | B2* | 2/2019 | Zheng | G06F 9/451 |
| 10,275,121 | B1* | 4/2019 | Geiger | H04L 29/06176 |
| 10,339,365 | B2* | 7/2019 | Gusarov | G06K 9/00248 |
| 10,504,266 | B2* | 12/2019 | Blattner | H04L 51/046 |
| 10,569,177 | B2* | 2/2020 | Nims | A63F 13/79 |
| 2006/0143569 | A1* | 6/2006 | Kinsella | G06Q 10/107 715/752 |
| 2007/0002057 | A1 | 1/2007 | Danzig et al. | |
| 2007/0113181 | A1* | 5/2007 | Blattner | G06F 3/011 715/706 |
| 2009/0209236 | A1 | 8/2009 | Bloebaum et al. | |
| 2012/0327091 | A1* | 12/2012 | Eronen | G06F 3/0346 345/473 |
| 2013/0194280 | A1* | 8/2013 | Kwon | G06T 15/00 345/473 |
| 2014/0160149 | A1* | 6/2014 | Blackstock | G06N 3/006 345/619 |
| 2014/0325000 | A1* | 10/2014 | Lorch | H04M 1/7253 709/206 |
| 2015/0121251 | A1* | 4/2015 | Kadirvel | H04M 1/72544 715/753 |
| 2016/0179967 | A1* | 6/2016 | Sa | G06F 16/3346 707/730 |
| 2016/0292903 | A1* | 10/2016 | Li | G06T 13/80 |
| 2016/0344663 | A1* | 11/2016 | Hwang | H04L 51/04 |
| 2017/0113140 | A1* | 4/2017 | Blackstock | G06N 3/006 |
| 2018/0068020 | A1* | 3/2018 | Lee | G06Q 10/10 |

FOREIGN PATENT DOCUMENTS

| | | |
|---|---|---|
| CN | 103368816 | 10/2013 |
| CN | 105099860 | 11/2015 |
| WO | 2015122993 | 8/2015 |

OTHER PUBLICATIONS

International Search Report dated Aug. 10, 2017 in PCT/CN2017/084142 filed May 12, 2017. (With English Translation).
Combined Office Action and Search Report dated Jan. 3, 2020 in Chinese Patent Application No. 201610321679.3 (with Concise English language translation).

* cited by examiner

INSTANT MESSAGING METHOD AND APPARATUS FOR SELECTING MOTION FOR A TARGET VIRTUAL ROLE

RELATED APPLICATION

This application is a continuation of International Application No. PCT/CN2017/084142, filed on May 12, 2017, which claims priority to China Patent Application No. 201610321679.3, filed with the Chinese Patent Office on May 12, 2016 and entitled "INSTANT MESSAGING METHOD AND APPARATUS". The entire disclosures of the prior applications are hereby incorporated by reference in their entirety.

FIELD OF THE TECHNOLOGY

This application relates to instant messaging.

BACKGROUND OF THE DISCLOSURE

Along with the development of network technologies, instant messaging software such as QQ or MSN has become more common in people's daily life. When users use the software, to increase flexibility of communication and to accurately express feelings of the users, some virtual role motions such as kneeling to beg for a red envelope and kissing need to be displayed during a communication process, to express particular meanings and enrich communication content.

SUMMARY

Embodiments of this application include instant messaging methods, apparatuses, and non-transitory computer-readable mediums. The technical solutions are as follows:

According to a first aspect, an instant messaging method is provided. A motion display request is received from a first client. The motion display request includes an identifier of a target virtual role and an identifier of a target motion data set. The identifier of the target motion data set is indicated by a motion display instruction received by the first client. The target virtual role corresponds to a target user. The target user is at least one user of a plurality of instant messaging users, and the first client is a client to which a certain user in the instant messaging users logs in. The target motion data set according to the identifier of the target motion data set is obtained. The target virtual role according to the identifier of the target virtual role is obtained. The target motion data set and the target virtual role are sent to at least one client of a plurality of designated clients corresponding to the instant messaging users. The at least one client of the designated clients displays the target virtual role based on the target motion data set.

According to a second aspect, an instant messaging apparatus is provided. The apparatus includes processing circuitry configured to receive a motion display request from a first client. The motion display request includes an identifier of a target virtual role and an identifier of a target motion data set. The identifier of the target motion data set is indicated by a motion display instruction received by the first client. The target virtual role corresponds to a target user. The target user is at least one user of a plurality of instant messaging users, and the first client is a client to which a certain user in the instant messaging users logs in. The processing circuitry is configured to obtain target motion data set according to the identifier of the target motion data set and obtain the target virtual role according to the identifier of the target virtual role. The processing circuitry is further configured to send the target motion data set and the target virtual role to at least one client of a plurality of designated clients corresponding to the instant messaging users. The at least one client of the designated clients displays the target virtual role based on the target motion data set.

According to a third aspect, a non-transitory computer-readable medium stores a program executable by a processor to obtain, after receiving a motion display instruction, an identifier of a target motion data set indicated by the motion display instruction. A target user of a plurality of instant messaging users is determined according to the motion display instruction. An identifier of a target virtual role corresponding to the target user is obtained. A motion display request is sent to a server. The motion display request includes the identifier of the target virtual role and the identifier of the target motion data set. The target motion data set and the target virtual role are sent by the server to at least one client of a plurality of clients of the instant messaging users. The target motion data set and the target virtual role are received from the server. The target virtual role is displayed. The target virtual role moves based on the target motion data set during a display process.

According to a fourth aspect, a non-transitory computer-readable medium stores a program executable by a processor to receive a target motion data set and a target virtual role from a server. The target motion data set is obtained by the server according to an identifier of the target motion data set in a motion display request. The target virtual role is obtained by the server according to an identifier of the target virtual role in the motion display request. The motion display request is sent to the server after a first client receives a motion display instruction and obtains the identifier of the target virtual role and the identifier of the target motion data set. The motion display instruction indicates the identifier of the target motion data set, and the first client is a client to which a certain user of a plurality instant messaging users logs in. The target virtual role is displayed. The target virtual role moves based on the target motion data set during a display process.

According to a fifth aspect, a non-transitory computer-readable medium stores a program executable by a processor to perform the instant messaging method described above.

BRIEF DESCRIPTION OF THE DRAWINGS

To describe the technical solutions in the embodiments of this application more clearly, the following briefly introduces the accompanying drawings required for describing the embodiments. The accompanying drawings in the following description show merely some embodiments of this application, and other drawings may still be derived from these accompanying drawings.

DESCRIPTION OF EMBODIMENTS

To make the objectives, technical solutions, and advantages of this application clearer, the following further describes implementations of this application in detail with reference to the accompanying drawings.

Figure 1:
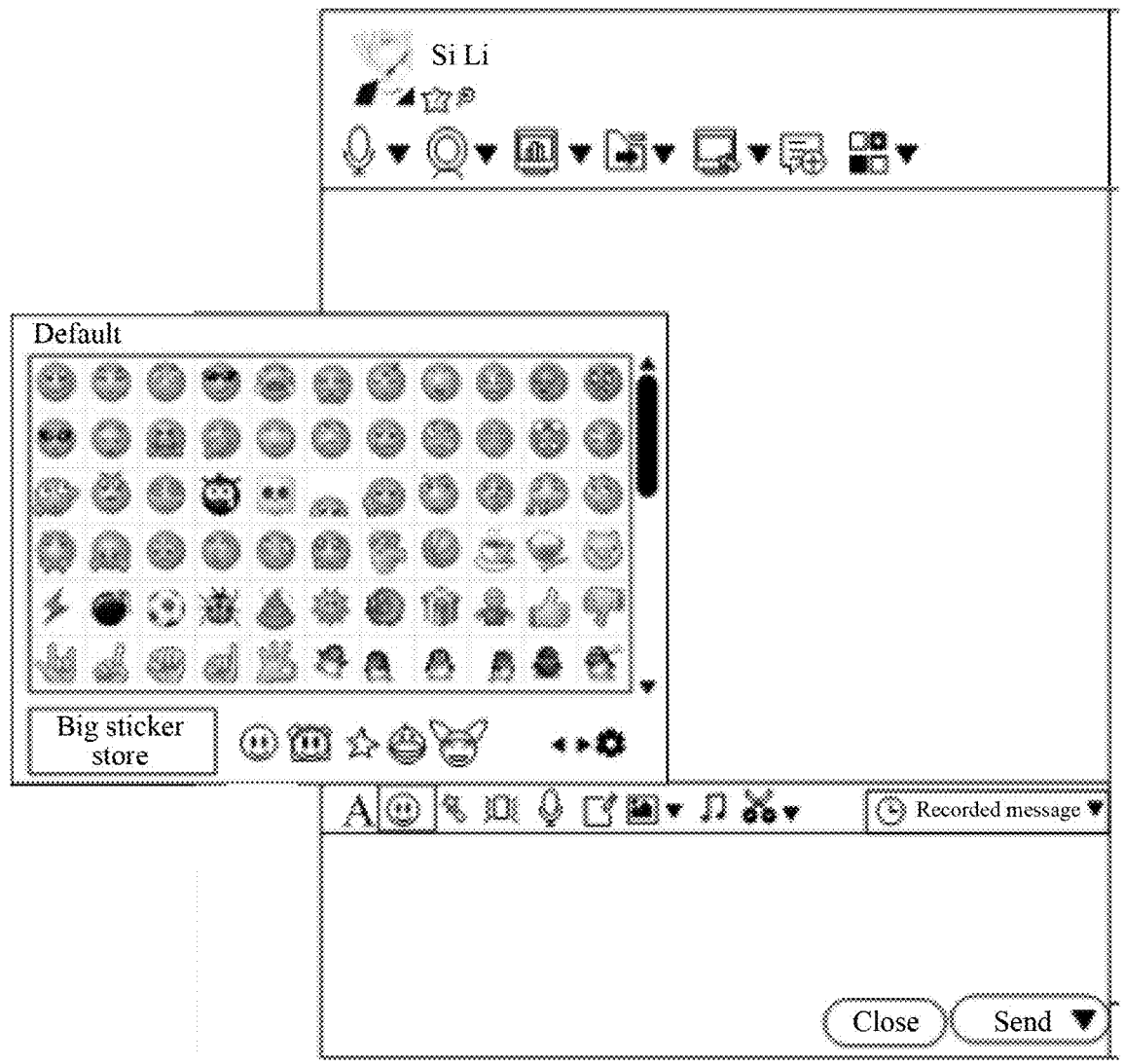
FIG. 1 is an application scenario diagram of an instant messaging scenario according to an embodiment of this application.

FIG. 1 is an application scenario diagram of an instant messaging scenario according to an embodiment of this application. Referring to FIG. 1, when users chat and communicate with each other on terminals by using instant messaging software, the users may need to express feelings, or the users may desire to make a chatting process more interesting. In this case, the users may send some sticker images, as shown in FIG. 1. In the chatting process, besides sending the sticker images, the users may also send virtual role motions (e.g., animated stickers), such as QQ stickers in FIG. 1, so that all the terminals of the users that are chatting with each other may display the virtual role motions, thereby further making the chatting process more interesting.

Figure 2:
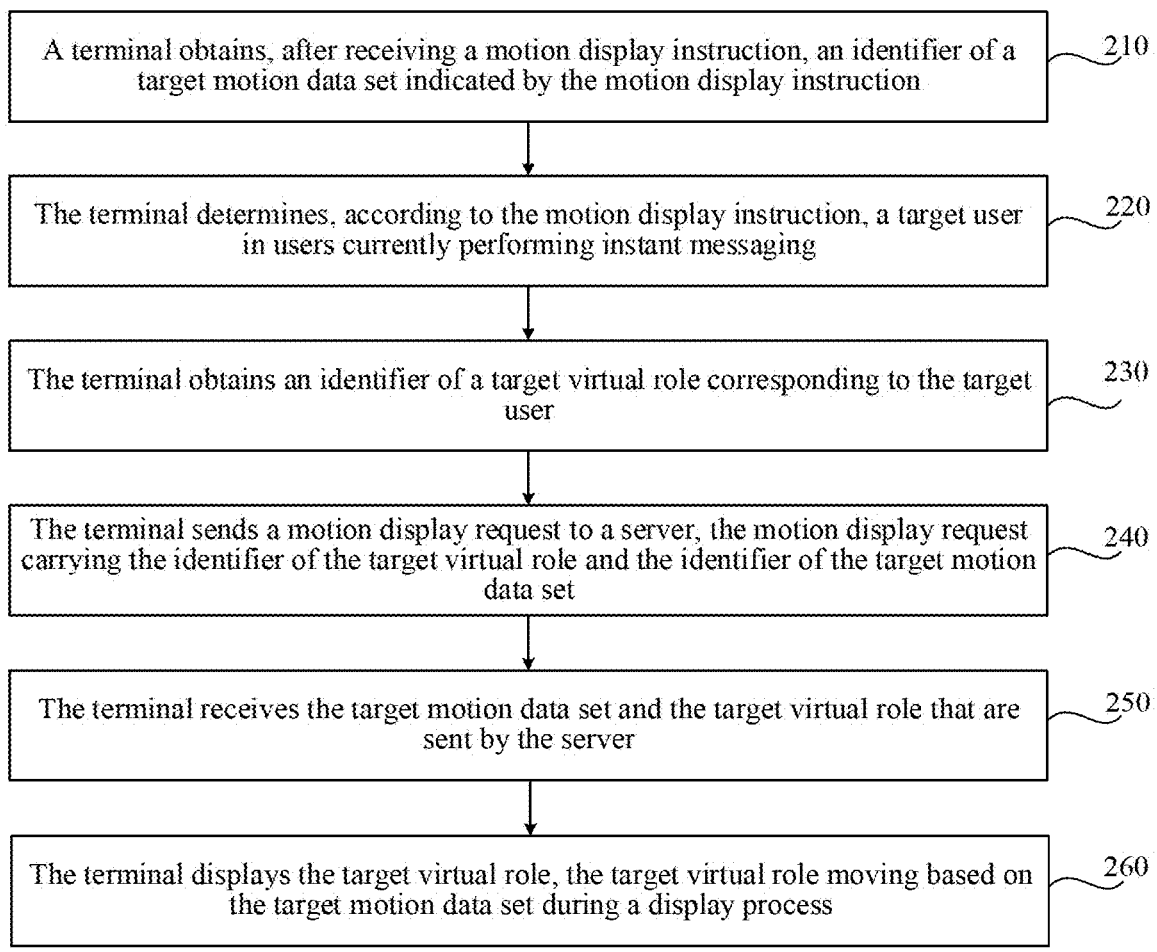
FIG. 2 is a flowchart of an instant messaging method according to an embodiment of this application.

FIG. 2 is a flowchart of an instant messaging method according to an exemplary embodiment. As shown in FIG. 2, the instant messaging method is used in a terminal and includes the following steps:

In step 210, a terminal obtains, after receiving a motion display instruction, an identifier of a target motion data set indicated by the motion display instruction.

In step 220, the terminal determines, according to the motion display instruction, a target user in users currently performing instant messaging.

In step 230, the terminal obtains an identifier of a target virtual role corresponding to the target user.

In step 240, the terminal sends a motion display request to a server, the motion display request carrying the identifier of the target virtual role and the identifier of the target motion data set, so that the server sends the target motion data set and the target virtual role to at least one client in designated clients corresponding to the users currently performing instant messaging.

In step 250, the terminal receives the target motion data set and the target virtual role that are sent by the server.

In step 260, the terminal displays the target virtual role, the target virtual role moving based on the target motion data set during a display process.

Based on the above, in the instant messaging method provided in this embodiment, an instant messaging client obtains, after receiving a motion display instruction, an identifier of a target virtual role and an identifier of a target motion data set, the identifier of the target virtual role corresponding to a target user in users currently performing instant messaging, and sends the identifier of the target virtual role and the identifier of the target motion data set to a server, so that the server returns the target virtual role and the target motion data set. The instant messaging client may display the target virtual role based on the target motion data set, to separate a virtual role image from an executed motion, thereby greatly increasing motion types that can be executed by the virtual role, and enriching the display effect of the virtual role motion.

Figure 3:
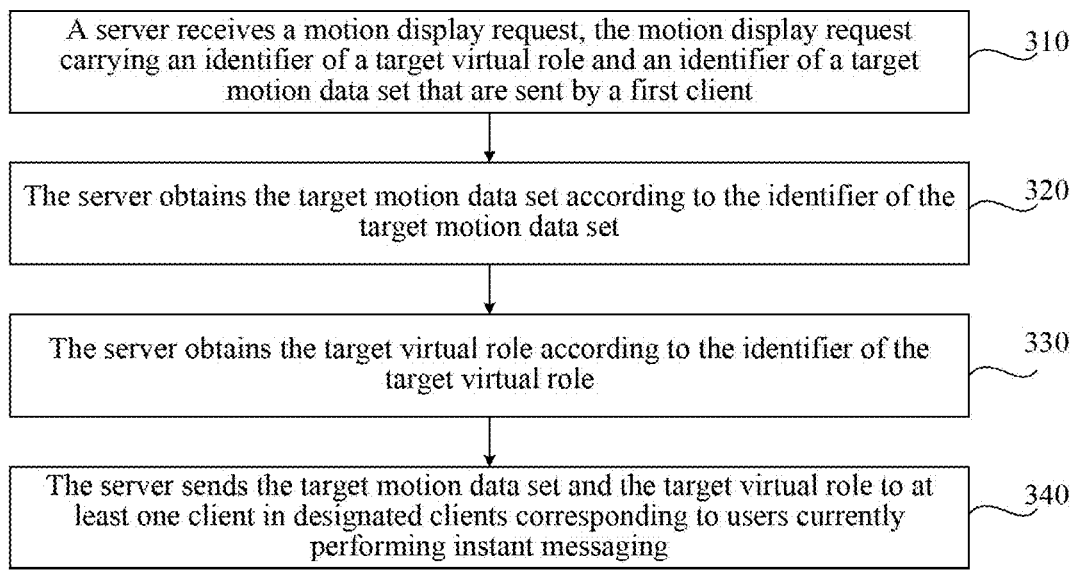
FIG. 3 is a flowchart of another instant messaging method according to an embodiment of this application.

FIG. 3 is a flowchart of an instant messaging method according to an exemplary embodiment. As shown in FIG. 3, the instant messaging method is used in a server and includes the following steps:

In step 310, a server receives a motion display request, the motion display request carrying an identifier of a target virtual role and an identifier of a target motion data set that are sent by a first client, the identifier of the target motion data set being indicated by a motion display instruction received by the first client, the target virtual role being a virtual role corresponding to a target user, the target user being at least one user in users currently performing instant messaging, and the first client being a client to which a certain user in the users currently performing instant messaging logs in.

In step 320, the server obtains the target motion data set according to the identifier of the target motion data set.

In step 330, the server obtains the target virtual role according to the identifier of the target virtual role.

In step 340, the server sends the target motion data set and the target virtual role to at least one client in designated clients corresponding to the users currently performing instant messaging, so that the at least one client in the designated clients displays the target virtual role based on the target motion data set.

Based on the above, in the instant messaging method provided in this embodiment, a server obtains, after receiving a motion display instruction, a target virtual role and a target motion data set according to the motion display instruction, and sends the target virtual role and the target motion data set to at least one client in designated clients corresponding to users currently performing instant messaging, so that the at least one client in the designated clients displays the target virtual role based on the target motion data set, to separate a virtual role image from an executed motion, thereby greatly increasing motion types that can be executed by the virtual role, and enriching the display effect of the virtual role motion.

Figure 4:
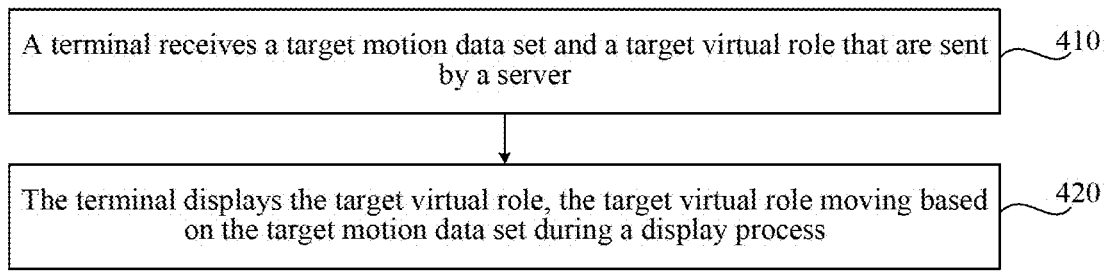
FIG. 4 is a flowchart of still another instant messaging method according to an embodiment of this application.

FIG. 4 is a flowchart of an instant messaging method according to an exemplary embodiment. As shown in FIG. 4, the instant messaging method is used in a terminal and includes the following steps:

In step 410, a terminal receives a target motion data set and a target virtual role that are sent by a server, the target motion data set being obtained by the server according to an identifier of the target motion data set in a motion display request, the target virtual role being obtained by the server according to an identifier of the target virtual role in the motion display request, the motion display request being sent to the server after a first client receives a motion display instruction and obtains the identifier of the target virtual role and the identifier of the target motion data set, the motion display instruction indicating the identifier of the target motion data set, and the first client being a client to which a certain user in users currently performing instant messaging logs in.

In step 420, the terminal displays the target virtual role, the target virtual role moving based on the target motion data set during a display process.

Based on the above, in the instant messaging method provided in this embodiment, a target motion data set and a target virtual role are received, and the target virtual role is displayed based on the target motion data set, to separate a virtual role image from an executed motion, thereby greatly increasing motion types that can be executed by the virtual role, and enriching the display effect of the virtual role motion.

Figure 5:
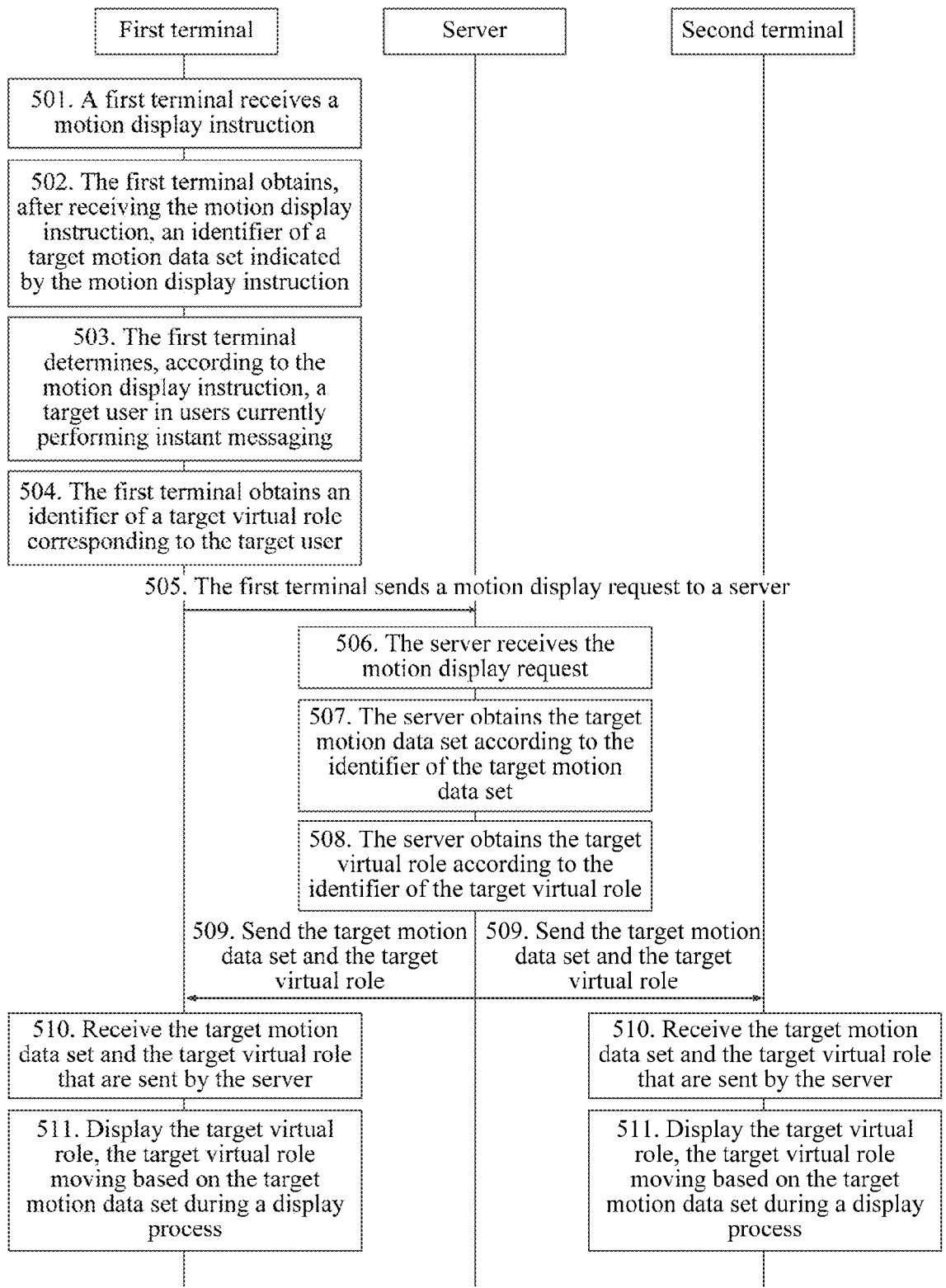
FIG. 5 is a flowchart of still another instant messaging method according to an embodiment of this application.

FIG. 5 is a flowchart of an instant messaging method according to an exemplary embodiment. As shown in FIG. 5, the instant messaging method includes the following steps:

In step 501, a first terminal receives a motion display instruction.

Figure 6:
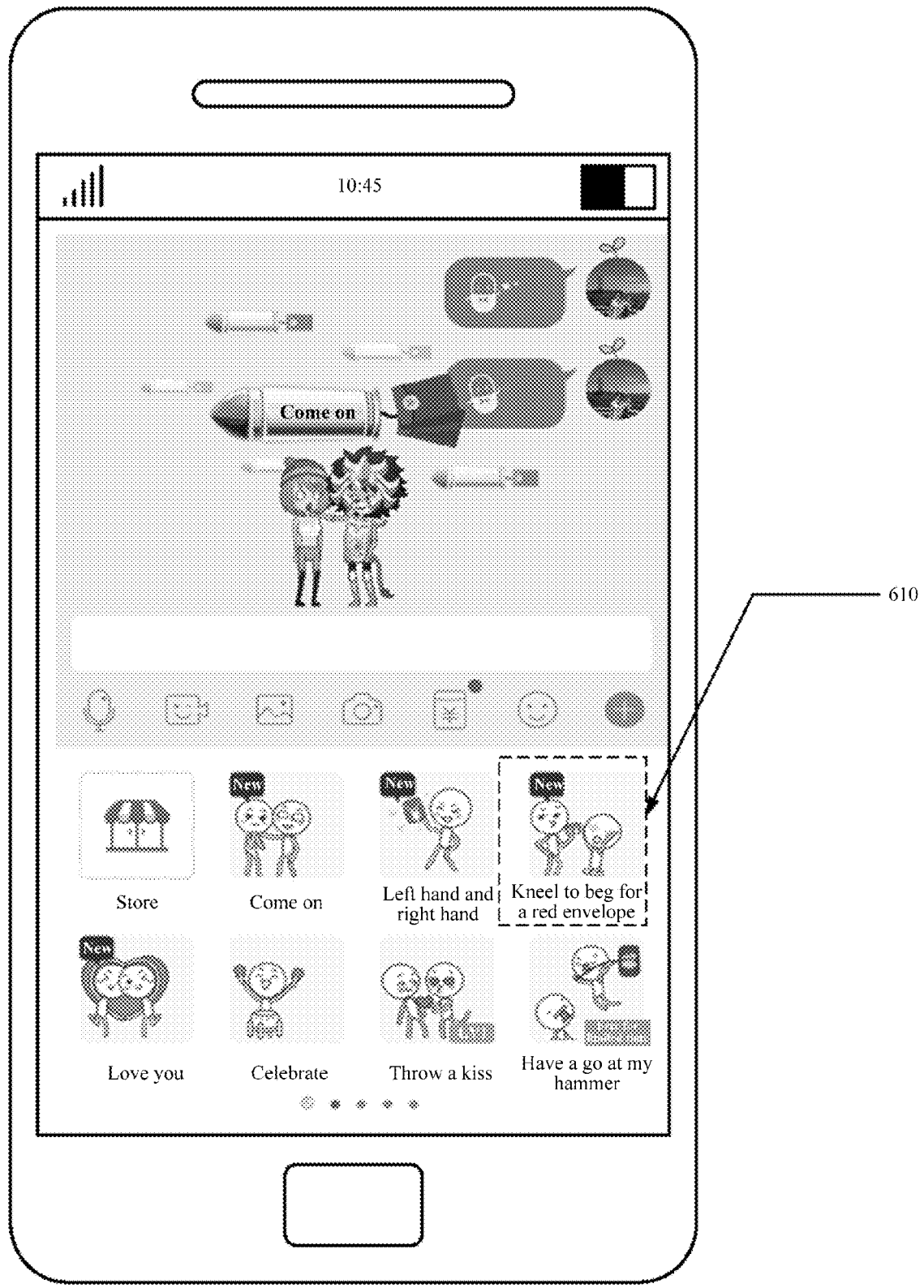
FIG. 6 is a schematic diagram of a motion display option according to an embodiment of this application.

In application, the first terminal may display at least one motion display option in a local instant messaging client, and each motion display option corresponds to a virtual role motion. In application, one virtual role motion may include two parts of content, namely, a virtual role and a motion, and the virtual role motion refers to a certain virtual role executing a certain motion. In an embodiment of this application, as shown in FIG. 6, the at least one motion display option 610 may be set in an instant messaging chat interface, and is not specifically limited in this application.

To make the instant messaging communication more colorful and interesting, a user may desire to send a virtual role motion, to enable another user currently performing instant messaging to receive and view the virtual role motion. In this case, the user may trigger any one of the motion display options. After detecting a trigger operation on the any one of the motion display options, a first terminal receives a motion display instruction, the motion display instruction being used to display a virtual role motion corresponding to the triggered motion display option. For example, as shown in FIG. 6, a local user may trigger a "come on" motion display option, and the first terminal receives the motion display instruction after the local user triggers the "come on" motion display option, the motion display instruction being used to indicate a "come on" virtual role motion.

It is noted that the first terminal is installed with an instant messaging client, and the instant messaging client installed on the first terminal is a first instant messaging client in the following.

In step 502, the first terminal obtains, after receiving the motion display instruction, an identifier of a target motion data set indicated by the motion display instruction.

Specifically, the motion display instruction may indicate an identifier of one target motion data set, the identifier of the target motion data set is used to uniquely indicate one target motion data set, the target motion data set includes at least one piece of motion data, and each piece of motion data is used to instruct one or more parts of a virtual role to execute a designated motion.

In step 503, the first terminal determines, according to the motion display instruction, a target user in users currently performing instant messaging.

Figure 7:
FIG. 7 is an exemplary diagram of a target virtual role according to an embodiment of this application.

In application, in the virtual role motion that the user desires to send, that is, the virtual role motion indicated by the motion display instruction, the included virtual role may correspond to one or more users in the users currently performing instant messaging, to make the virtual role motion more interesting, and increase interactions between the instant messaging communications users, thereby being beneficial to increase user stickiness. For example, the virtual role corresponding to a user in the users currently performing instant messaging may be a cartoon lion wearing taekwondo uniforms. As shown in FIG. 7, the virtual role motion sent by the local user may include the cartoon lion, and is specifically that the cartoon lion lifts upper limbs and cheers. To achieve the objective, a target user needs to be determined, and then an identifier of a target virtual role corresponding to the target user is determined.

It is noted that the "users currently performing instant messaging" are, in certain embodiments, the local user and users performing instant messaging chat with the local user, or users of an instant messaging group which the local user is currently in.

It is also noted that the local user is, in certain embodiments, an instant messaging user corresponding to an instant messaging user account currently logged into in the first terminal.

In the following, this application briefly describes a technical process of step 503. Specifically, the motion display instruction may be used to indicate the number of the target users. For example, as shown in FIG. 6, after the local user triggers the "come on" motion display option, the number of the target users indicated by the motion display instruction received by the first terminal is 2, and after the local user triggers a "left hand and right hand" motion option, the number of the target users indicated by the motion display instruction received by the first terminal is 1. The number of the target users determined in this application may be equal to the number of the target users indicated by the motion display instruction. In some cases, the determined number of the target users may alternatively be not equal to the number of the target users indicated by the motion display instruction, which is not specifically limited in this application. The technical process of step 503 slightly differs according to the different numbers of the target users indicated by the motion display instruction, and may specifically be divided into the following two types.

The first type is that the first terminal determines a local user currently performing instant messaging as the target user when the motion display instruction indicates that the number of the target users is 1.

It needs to be noted that in an embodiment of this application, when the motion display instruction indicates that the number of the target users is 1, the first terminal may alternatively determine any user in the users currently performing instant messaging as the target user according to a selection user of the local user. Specifically, the first terminal may display user options, the user options being options corresponding to users other than the local user that are in the users currently performing instant messaging, and when detecting a trigger option on any user option in the user options, the first terminal determines a user corresponding to the triggered user option as the target user.

The second type is that the first terminal determines the number of the users currently performing instant messaging when the motion display instruction indicates that the number of the target users is greater than 1; the first terminal determines the users currently performing instant messaging as the target users when the number of the target users indicated by the motion display instruction is equal to the number of the users currently performing instant messaging; and the first terminal receives a user selection instruction when the number of the target users indicated by the motion display instruction is not equal to the number of the users currently performing instant messaging, and determines a selected user indicated by the user selection instruction as the target user, the selected user being a user in the users currently performing instant messaging.

Based on the above, when the motion display instruction indicates that the number of the target users is greater than 1, there are two possibilities.

One possibility is that the number of the target users indicated by the motion display instruction is equal to the number of the users currently performing instant messaging. For example, currently, the local user performs instant messaging chat with a user A. In this case, the number of the users currently performing instant messaging is 2. If the local user triggers the "come on" motion display option, the motion display instruction received by the first terminal indicates that the number of the target users is 2, that is, the number of the target users indicated by the motion display instruction is equal to the number of the users currently performing instant messaging. In this case, the first terminal determines the users currently performing instant messaging as the target users, that is, determines the local user and the user A in the foregoing example as the target users.

The other possibility is that the number of the target users indicated by the motion display instruction is not equal to the number of the users currently performing instant messaging. For example, the number of users in the instant messaging group which the local user is currently in is 10. If the local user triggers the "come on" motion display option, the motion display instruction received by the first terminal indicates that the number of the target users is 2, that is, the number of the target users indicated by the motion display instruction is not equal to the number of the users currently performing instant messaging.

In this case, if the number of the target users indicated by the motion display instruction is greater than the number of the users currently performing instant messaging, it indicates that the virtual roles included in the virtual role motion indicated by the motion display instruction cannot correspond one-to-one to the users currently performing instant messaging. In this case, the first terminal may display an error option, and the error option is used to inform the local user that the virtual role motion indicated by the motion display instruction is not available, and the process is ended. In an embodiment of this application, in this case, the first terminal may alternatively determine the users currently performing instant messaging as the target users, to enable the virtual roles corresponding to the target users to correspond one-to-one to some virtual roles in the virtual roles included in the virtual role motion indicated by the motion display instruction.

If the number of the target users indicated by the motion display instruction is less than the number of the users currently performing instant messaging, it indicates that the virtual roles included in the virtual role motion indicated by the motion display instruction can correspond one-to-one to the users currently performing instant messaging. In this case, the first terminal may display at least one user option. In an embodiment of this application, the at least one user option is options corresponding to at least one user other than the local user in the users currently performing instant messaging. In another embodiment of this application, the user option is an option corresponding to at least one user in the users currently performing instant messaging. When detecting a trigger operation on one or more user options in the at least one user option, the first terminal receives the user selection instruction, the selected user indicated by the user selection instruction being a user corresponding to the triggered user option, and then the first terminal determines the selected user as the target user.

In step 504, the first terminal obtains an identifier of a target virtual role corresponding to the target user.

In step 505, the first terminal sends a motion display request to a server, the motion display request carrying the identifier of the target virtual role and the identifier of the target motion data set.

In step 506, the server receives the motion display request.

In step 507, the server obtains the target motion data set according to the identifier of the target motion data set.

Specifically, the server may maintain a motion data set database. After receiving the motion display request, the server may extract the identifier of the target motion data set from the motion display request, and then the server may obtain the target motion data set from the motion data set database according to the identifier of the target motion data set.

In step 508, the server obtains the target virtual role according to the identifier of the target virtual role.

Specifically, the server may maintain a virtual role database. After receiving the motion display request, the server may extract the identifier of the target virtual role from the motion display request, and then the server may obtain the target virtual role from the virtual role database according to the identifier of the target virtual role.

In step S509, the server sends the target motion data set and the target virtual role to at least one client in designated clients corresponding to the users currently performing instant messaging.

In application, the server may send the target motion data set and the target virtual role to the designated clients corresponding to all the users currently performing instant messaging. The server may alternatively send the target motion data set and the target virtual role to clients corresponding to the target users. When the target users do not include the local user, that is, do not include the user corresponding to the client in the terminal that sends the motion display request, the server may alternatively send the target motion data set and the target virtual role to the clients corresponding to the target users and the client corresponding to the local user. The server may alternatively send the target motion data set and the target virtual role to a selected client in the designated clients corresponding to the users currently performing instant messaging. In this case, the motion display request may also carry a selected user identifier, the selected user identifier being indicated by a selected user instruction received by the first terminal. The server may determine the selected client corresponding to the selected user identifier according to the selected user identifier, and send the target motion data set and the target virtual role to the selected client. This is not specifically limited in this application.

It needs to be noted that the clients described in this application are instant messaging clients.

In step 510, the first terminal and a second terminal receive the target motion data set and the target virtual role that are sent by the server.

The second terminal is any terminal that receives the target motion data set and the target virtual role that are sent by the server, that is, a terminal corresponding to any client in the at least one client in the designated clients corresponding to the users currently performing instant messaging.

In step 511, the first terminal and the second terminal display the target virtual role, the target virtual role moving based on the target motion data set during a display process.

It needs to be noted that, a manner in which the first terminal displays the target virtual role is the same as a manner in which the second terminal displays the target virtual role. Therefore, this application briefly describes step 511 by using an example in which the first terminal displays the target virtual role.

A specific technical process in which the first terminal displays the target virtual role slightly differs according to different numbers of the target users indicated by the motion display instruction. In the following, this application briefly describes, according to the different numbers of the target users indicated by the motion display instruction, the specific technical process in which the first terminal displays the target virtual role.

A first case is that the number of the target users indicated by the motion display instruction is 1. In this case, each piece of motion data in the target motion data set acts on one target virtual role corresponding to the one target user. Therefore, the one target virtual role can move based on the target motion data set.

A second case is that the number of the target users indicated by the motion display instruction is greater than 1. In this case, the number of the target virtual roles is greater than 1. Therefore, some motion data in the target motion data set acts on a certain target virtual role, and some motion data in the target motion data set acts on another target virtual role, and the like. In this case, the target motion data set includes n target motion data subsets, n being greater than 1, and n being equal to the number of the target users, and each target motion data subset corresponds to one target virtual role. In this case, the first terminal needs to determine the target motion data subset corresponding to each target virtual role in the target motion data set, and each target virtual role moves based on the target motion data subset corresponding to each target virtual role in the display process.

Specifically, when the motion display instruction indicates that the number of the target users is greater than 1, the virtual role motion indicated by the motion display instruction includes more than one sub-motions, the number of the sub-motions is equal to the number of the target users, and the sub-motions are motions need to be executed by different virtual roles in the virtual role motion. For example, after the local user triggers a "come on" motion option, the first terminal receives the motion display instruction, the number of the target users indicated by the motion display instruction is 2, the first terminal determines the local user and the user A as the target users, and the "come on" virtual role motion includes a sub-motion of holding one clenched first in the other hand moving before the chin and a sub-motion of patting on the shoulder. A target virtual role corresponding to a certain user in the target users needs to perform the sub-motion of holding one clenched first in the other hand moving before the chin, and a target virtual role corresponding to the other target user needs to perform the sub-motion of patting on the shoulder. Each sub-motion corresponds to one target motion data subset.

Therefore, before displaying the target virtual roles, the first terminal needs to determine the target motion data subset corresponding to each target virtual role, so that each target virtual role moves based on the target motion data subset corresponding to each target virtual role. In the foregoing example, the first terminal may determine a target motion data subset corresponding to a target virtual role corresponding to the local user as a holding one clenched first in the other hand target motion data subset, and a target motion data subset corresponding to a target virtual role corresponding to the user A as a patting on the shoulder target motion data subset. When the first terminal displays the target virtual roles, the target virtual role corresponding to the local user may perform the motion of holding one clenched first in the other hand moving before the chin based on the holding one clenched first in the other hand target motion data subset, and the target virtual role corresponding to the user A may perform the motion of patting on the shoulder based on the patting on the shoulder target motion data subset.

In the following, this application describes a manner in which the first terminal determines the target motion data subset corresponding to each target virtual role in the target motion data set in the foregoing second case.

Specifically, the first terminal may determine the target motion data subset corresponding to each target virtual role in the target motion data set according to a received motion allocation instruction; or the first terminal may determine the target motion data subset corresponding to each target virtual role in the target motion data set according to a preset allocation order.

In application, the first terminal may provide at least one motion allocation option for each target virtual role, or for each target user, and each motion allocation option corresponds to one sub-motion of the virtual role motion, that is, one target motion data subset. When detecting a trigger operation on any motion allocation option of a certain target virtual role, the first terminal receives the motion allocation instruction, the motion allocation instruction being used to indicate the target motion data subset corresponding to the triggered motion allocation option, and the first terminal determines the target motion data subset as the target motion data subset corresponding to the certain target virtual role.

Alternatively, the first terminal may determine, based on a determining order of the target users, the target motion data subset corresponding to each target virtual role in the target motion data set according to an allocation policy. In the foregoing example, the local user is determined as the target user earlier than the user A is, the holding one clenched first in the other hand target motion data subset is determined as the target motion data subset corresponding to the target virtual role corresponding to the local user, and the patting on the shoulder target motion data subset is determined as the target motion data subset corresponding to the target virtual role corresponding to the user A.

In an embodiment of this application, to enable the second terminal to display the target virtual role according to the target motion data subset allocated by the first terminal for each target virtual role, this application may further perform step (11) to step (15).

In step (11), the first terminal sends subset dividing information to the server, the subset dividing information including an identifier of the target motion data subset corresponding to each target virtual role.

In step (12), the server receives the subset dividing information sent by the first terminal.

In step (13), the server sends the subset dividing information to the at least one client in the designated clients.

In application, the server may send the subset dividing information to the designated clients corresponding to all the users currently performing instant messaging. The server may alternatively send the subset dividing information to clients corresponding to the target users. When the target users do not include the local user, that is, do not include the user corresponding to the client in the terminal that sends the motion display request, the server may alternatively send the subset dividing information to the clients corresponding to the target users and the client corresponding to the local user. The server may alternatively send the subset dividing information to a selected client in the designated clients corresponding to the users currently performing instant messaging. In this case, the motion display request may also carry a selected user identifier, the selected user identifier being indicated by a selected user instruction received by the first terminal. The server may determine the selected client corresponding to the selected user identifier according to the selected user identifier, and send the subset dividing information to the selected client. This is not specifically limited in this application.

In step (14), the second terminal receives the subset dividing information sent by the server.

In step (15), the second terminal displays each target virtual role, each target virtual role moving based on the target motion data subset corresponding to each target virtual role during a display process.

This application describes how the first terminal determines a correspondence between the target virtual role and the motion data in the target motion data set when the number of the target users indicated by the motion display instruction is different. In the following, this application specifically describes how the target virtual role moves based on the target motion data set. This application still uses the first terminal as an example. Specifically, the target virtual role includes a plurality of skeletal parts, the target motion data set includes motion data of at least one skeletal part, and the target virtual role includes a plurality of decorative slices corresponding to the plurality of skeletal parts and used for decorating the corresponding skeletal parts.

In application, the first terminal may display the target virtual role, the plurality of decorative slices of the target virtual role moving based on the motion data of the skeletal parts corresponding to the plurality of decorative slices during the display process.

It needs to be noted that in application, the plurality of skeletal parts of the target virtual role are invisible, a user can only see the plurality of decorative slices on the target virtual role, and the plurality of decorative slices corresponds to the plurality of skeletal parts and is used for decorating the corresponding skeletal parts. For example, a certain target virtual role may include two decorative slices, namely, an ushanka and aviator sunglasses. A skeletal part corresponding to the ushanka is a headgear part, a skeletal part corresponding to the aviator sunglasses is a glasses part, and the ushanka and the aviator sunglasses are respectively located at the headgear part and the glasses part, and are used for decorating decorate the headgear part and the glasses part.

As described above, because a visible part of the target virtual role is the plurality of decorative slices, that the target virtual role moves based on the motion data of the skeletal parts in the target motion data set is essentially that the plurality of decorative slices of the target virtual role moves based on the motion data of the skeletal parts corresponding to the plurality of decorative slices. For example:

After obtaining the target motion data set, the first terminal may enable the skeletal parts of the target virtual role to move according to the motion data of the skeletal parts in the target motion data set during the display process, so that the decorative slices located on the skeletal parts also move.

It also needs to be noted that the virtual roles provided in this embodiment of this application may be formed by the same plurality of skeletal parts, the plurality of skeletal parts of different virtual roles may correspond to different decorative slices, or some skeletal parts of some virtual roles may not have decorative slices. Therefore, although the skeletal parts of the virtual roles are the same, different images of the virtual roles may be formed.

In application, a situation may occur that the target motion data set include the motion data of a certain skeletal part, but the skeletal part of the target virtual role does not have a decorative slice. In this case, the skeletal part having no decorative slice may still move according to the target motion data set. However, because skeletal part does not have the decorative slice, a user cannot view a motion of the skeletal part.

For example, the target motion data set includes motion data of a tail part, but the tail part of the target virtual role does not have a decorative slice. In this case, the tail part of the target virtual role still moves based on the motion data of the tail part in the target motion data set. However, because the skeletal part is invisible, and the tail part of the target virtual role does not have the decorative slice, the user cannot view a motion of the tail part of the target virtual role.

It also needs to be noted that in application, the plurality of skeletal parts of the target virtual role may be divided into different skeletal levels, for example, a parent skeletal level, and a child skeletal level. A motion of a skeletal part of the parent skeletal level may drive a skeletal part of the child skeletal level corresponding to the parent skeletal level to move. For example, a right upper arm part is the parent skeletal level, and a right lower arm part is the child skeletal level corresponding to the right upper arm part, then the right upper arm part performing a motion according to the motion data may drive the right lower arm part to move. That is, in this application, the target virtual role may include a plurality of skeletal part chains, and each skeletal part chain includes the skeletal part of the parent skeletal level and the skeletal part of the child skeletal level. For example, the right upper arm part and the right lower arm part are one skeletal chain. During the display process, the skeletal parts of the parent skeletal levels of various skeletal chains of the target virtual role move based on the target motion data set, and the skeletal parts of the child skeletal levels of the various skeletal chains move according to motions of the skeletal parts of the parent skeletal levels corresponding to the child skeletal levels.

Figure 8:
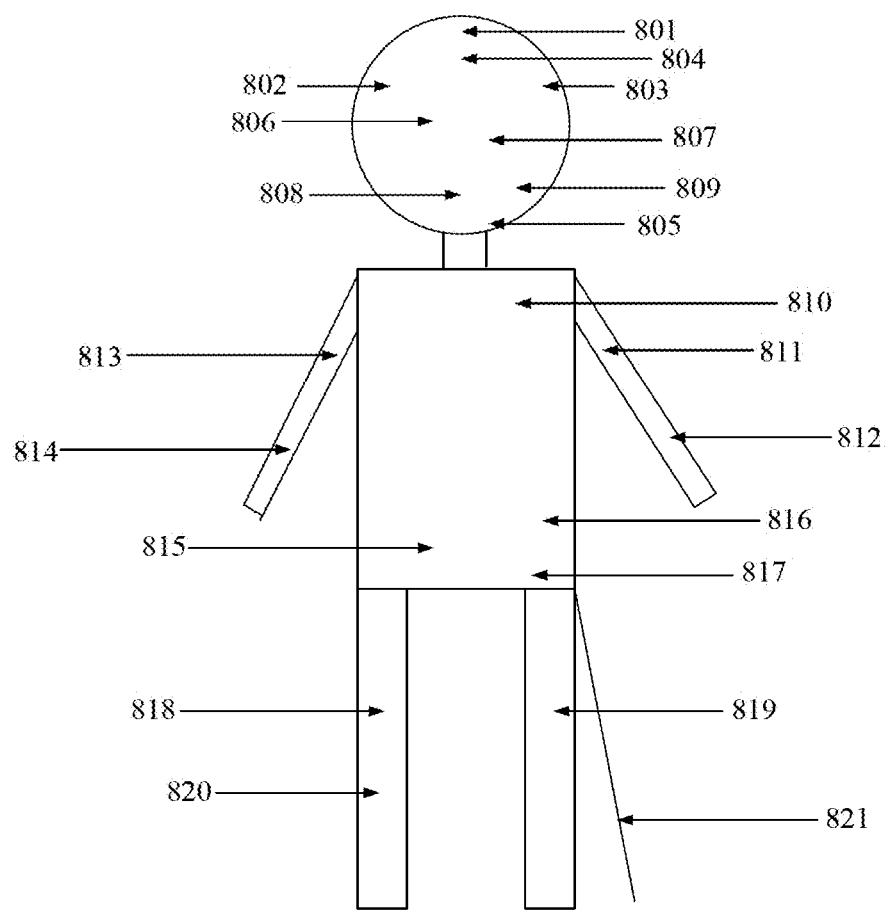
FIG. 8 is a schematic diagram of a plurality of skeletal parts of a virtual role according to an embodiment of this application.

In an embodiment of this application, each virtual role may be formed by a plurality of skeletal parts. As shown in FIG. 8, the plurality of skeletal parts may include: a headgear part 801, a left part of hair 802, a right part of the hair 803, a front part of the hair 804, a back part of the hair 805, an eye part 806, a glasses part 807, a mouth part 808, a head part 809, a back part 810, a right upper arm part 811, a right lower arm part 812, a left upper arm part 813, a left lower arm part 814, a belt part 815, an upper garment item part 816, a pants front piece part 817, a pants left piece part 818, a pants right piece part 819, a skirt part, 820 and a tail part 721. In application, the plurality of skeletal parts may only include some of the foregoing skeletal parts, or not only include the foregoing skeletal parts, but also include other skeletal parts not shown in this application, or include some of the foregoing skeletal parts and other skeletal parts not shown in this application. This is not specifically limited in this application.

In application, besides expecting the target virtual role to perform a corresponding motion according to an operation of the user, the user may also expect to replace the decorative slices of the target virtual role, that is, change an image of the target virtual role. To satisfy this need of the user, this application also provides the following method, including step (21) to step (25).

In step (21), a first terminal receives a decoration replacement instruction.

In step (22), the first terminal obtains an identifier of a target decorative slice data set indicated by the decoration replacement instruction.

In step (23), the first terminal sends a role replacement request to a server, the role replacement request carrying the identifier of the target decorative slice data set and an identifier of a local user currently performing instant messaging.

In step (24), the server receives the role replacement request sent by the first terminal.

In step (25), the server obtains the target decorative slice data set according to the identifier of the target decorative slice data set.

In step (26), the server generates a replacement virtual role based on the target decorative slice data set.

In step (27), the server determines the replacement virtual role as a virtual role corresponding to the local user, that is, an instant messaging user corresponding to the first terminal.

Specifically, the server may provide a virtual role image replacement option, and when the user wants to change the image of the target virtual role, the user may trigger the virtual role image replacement option, so that the terminal receives a decorative slice replacement instruction. After receiving the decorative slice replacement instruction, the terminal displays at least one decoration option, for example, a taekwondo uniforms decoration option, or a doctor decoration option. Each decoration option corresponds to one identifier of a decorative slice data set. The user triggers any decoration option according to personal likes and dislikes, so that the first terminal receives the decoration replacement instruction, and the decoration replacement instruction is used to indicate an identifier of a target decorative slice data set corresponding to the triggered decoration option. The server receives the role replacement request carrying the identifier of the target decorative slice data set and sent by the first terminal, and obtains the target decorative slice data set from a decorative slice database according to the identifier of the target decorative slice data set. Then the server generates the replacement virtual role by using the target decorative slice data set, and determines the replacement virtual role as the virtual role corresponding to the local user.

This application uses the first terminal as an example. In application, any terminal installed with an instant messaging client may perform a technical process of step (21) to step (25).

It needs to be noted that, when the replacement virtual role is generated by using the target decorative slice data set, a phenomenon in which some decorative slices are partially overlapped, for example, decorative slices such as an ushanka and a curly hair head. Because a skeletal part corresponding to the ushanka is a headgear part and a skeletal part corresponding to the curly hair head is a front part of hair, the ushanka and the curly hair head are partially overlapped. In this case, an overlapped area only displays one of the decorative slices. To determine to display which decorative slice in the overlapped area, different decorative slices may be divided into different drawing levels, and a decorative slice of a higher drawing level has priority to be displayed in the overlapped area. For example, a drawing level of the ushanka is higher than a drawing level of the curly hair head, and the ushanka rather than the curly hair head is displayed in the overlapped area of the ushanka and the curly hair head.

Figure 9:
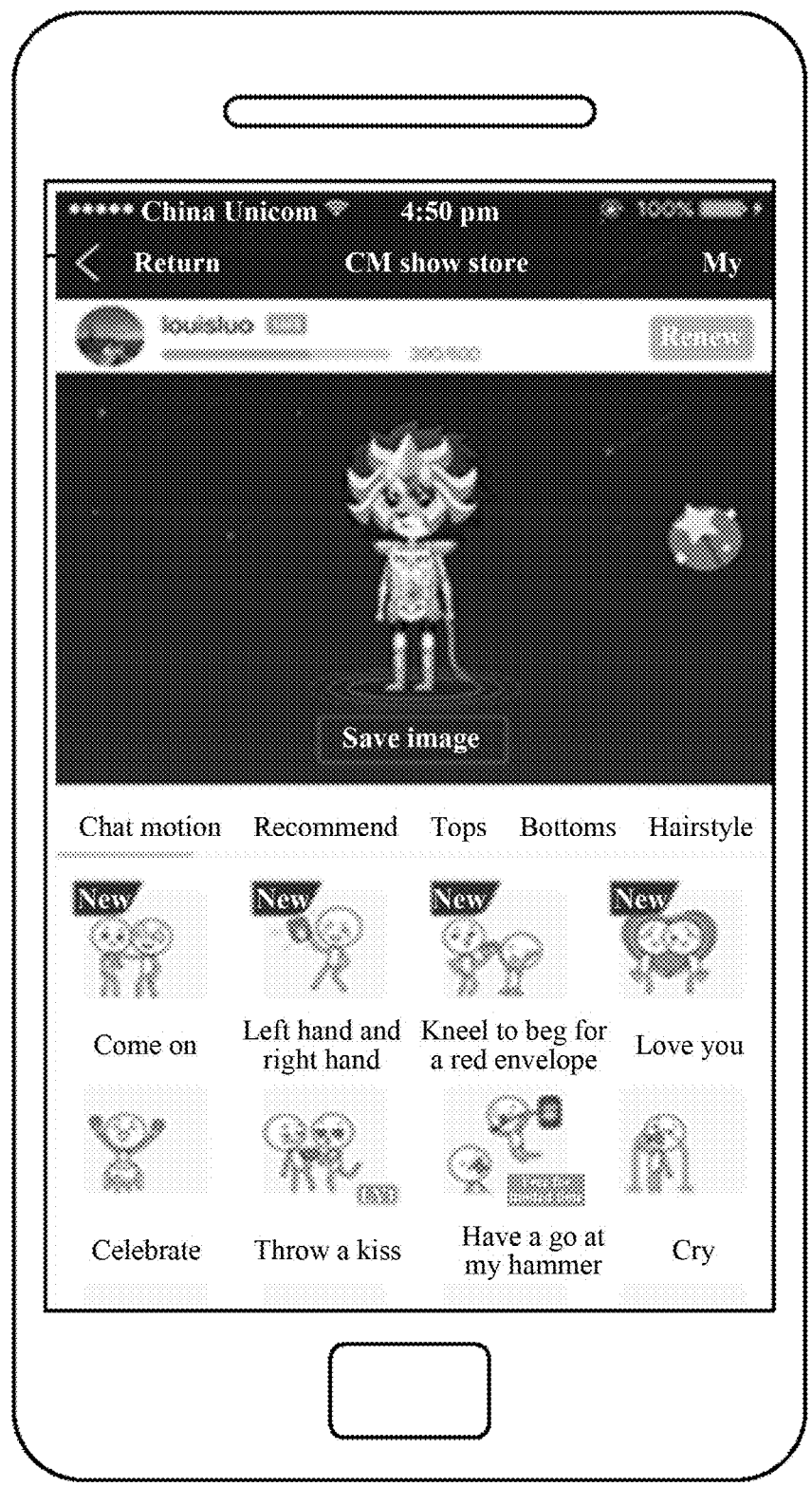
FIG. 9 is a schematic diagram of a motion purchase interface according to an embodiment of this application.

In application, to provide better and more targeted virtual role motion display service, a service provider may provide some paid motions that can be executed by the virtual role for user to purchase. To implement the foregoing technical process, this embodiment also provides the following method of purchasing a motion:

Displaying a motion purchase interface according to a received motion purchase instruction, as shown in FIG. 9, the motion purchase interface including at least one motion option; receive a designated motion purchase instruction, the designated motion purchase instruction being triggered when any one of the at least one motion option is selected; displaying a purchase interface according to the designated motion purchase instruction; determining, after receiving a payment instruction for the selected motion option on the purchase interface, that a motion data set indicated by the designated motion purchase instruction is an available motion data set; and sending a motion display request to a server, including: determining whether a target motion data set is the available motion data set, and sending the motion display request to the server when the target motion data set is the available motion data set Based on the above, in the instant messaging method provided in this embodiment, an instant messaging client obtains, after receiving a motion display instruction, an identifier of a target virtual role and an identifier of a target motion data set, the identifier of the target virtual role corresponding to a target user in users currently performing instant messaging, and sends the identifier of the target virtual role and the identifier of the target motion data set to a server, so that the server returns the target virtual role and the target motion data set. The instant messaging client may display the target virtual role based on the target motion data set, to separate a virtual role image from an executed motion, thereby greatly increasing motion types that can be executed by the virtual role, and enriching the display effect of the virtual role motion.

Figure 10:
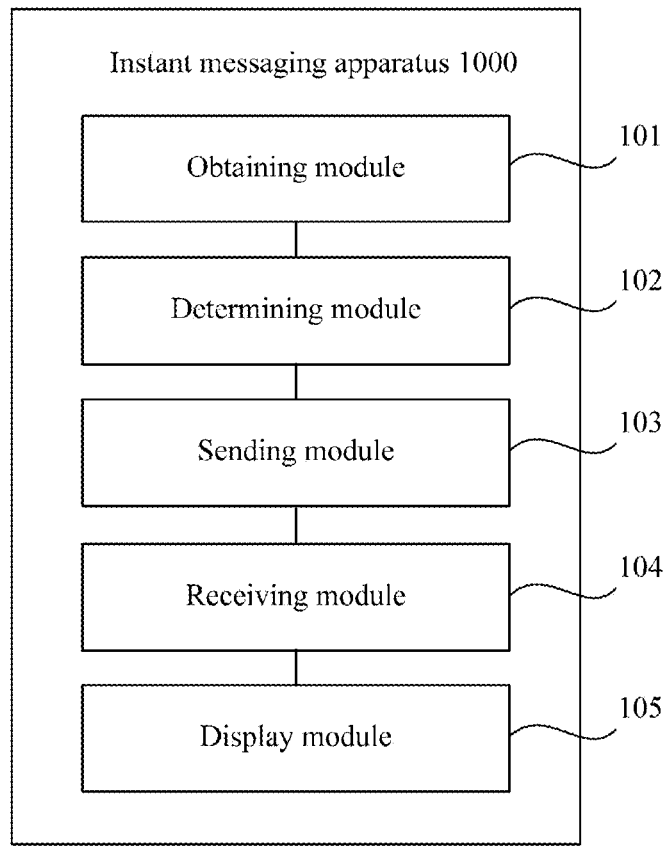
FIG. 10 is a block diagram of an instant messaging apparatus 1000 according to an embodiment of this application.

FIG. 10 is a block diagram of an instant messaging apparatus 1000 according to an exemplary embodiment. Referring to FIG. 10, the apparatus includes an obtaining module 101, a determining module 102, a sending module 103, a receiving module 104, and a display module 105.

The obtaining module 101 is configured to obtain, after receiving a motion display instruction, an identifier of a target motion data set indicated by the motion display instruction.

The determining module 102 is configured to determine, according to the motion display instruction, a target user in users currently performing instant messaging.

The obtaining module 101 is further configured to obtain an identifier of a target virtual role corresponding to the target user determined by the determining module 102.

The sending module 103 is configured to send a motion display request to a server, the motion display request carrying the identifier of the target virtual role and the identifier of the target motion data set that are obtained by the obtaining module 101, so that the server sends the target motion data set and the target virtual role to at least one client in designated clients corresponding to the users currently performing instant messaging.

The receiving module 104 is configured to receive the target motion data set and the target virtual role that are sent by the server.

The display module 105 is configured to display the target virtual role received by the receiving module 104, the target virtual role moving based on the target motion data set during a display process.

In an embodiment of this application, the motion display instruction is further used to indicate the number of the target users. The determining module 102 is configured to:

determine a local user currently performing instant messaging as the target user when the motion display instruction indicates that the number of the target users is 1;

determine the number of the users currently performing instant messaging when the motion display instruction indicates that the number of the target users is greater than 1;

determine the users currently performing instant messaging as the target users when the number of the target users indicated by the motion display instruction is equal to the number of the users currently performing instant messaging; and receive a user selection instruction when the number of the target users indicated by the motion display instruction is not equal to the number of the users currently performing instant messaging, and determine a selected user indicated by the user selection instruction as the target user, the selected user being a user in the users currently performing instant messaging.

In an embodiment of this application, when the number of the target users indicated by the motion display instruction is greater than 1, the display module 105 is configured to:

determine a target motion data subset corresponding to each target virtual role in the target motion data set, the target motion data set being formed by n target motion data subsets, and n being greater than 1; and display each target virtual role, each target virtual role moving based on the target motion data subset corresponding to each target virtual role during the display process.

In an embodiment of this application, the sending module 103 is further configured to:

send subset dividing information to the server, the subset dividing information including an identifier of the target motion data subset corresponding to each target virtual role, so that the server sends the subset dividing information to the receiving client.

In an embodiment of this application, the display module 105 is configured to:

determine the target motion data subset corresponding to each target virtual role in the target motion data set according to a received motion allocation instruction; or determine the target motion data subset corresponding to each target virtual role in the target motion data set according to a preset allocation order.

In an embodiment of this application, the target virtual role includes a plurality of skeletal parts, and the target motion data set includes motion data of at least one skeletal part.

The display module 105 is configured to display the target virtual role, the target virtual role moving based on the motion data of the skeletal part in the target motion data set during the display process.

In an embodiment of this application, the plurality of skeletal parts include a headgear part, a left part of hair, a right part of the hair, a front part of the hair, a back part of the hair, an eye part, a glasses part, a mouth part, a head part, a back part, a right upper arm part, a right lower arm part, a left upper arm part, a left lower arm part, a belt part, an upper garment item part, a pants front piece part, a pants left piece part, a pants right piece part, a skirt part, and a tail part.

In an embodiment of this application, the target virtual role includes a plurality of decorative slices corresponding to the plurality of skeletal parts and used for decorating the corresponding skeletal parts.

The display module 105 is configured to display the target virtual role, the plurality of decorative slices of the target virtual role moving based on the motion data of the skeletal parts corresponding to the plurality of decorative slices during the display process.

Figure 11:
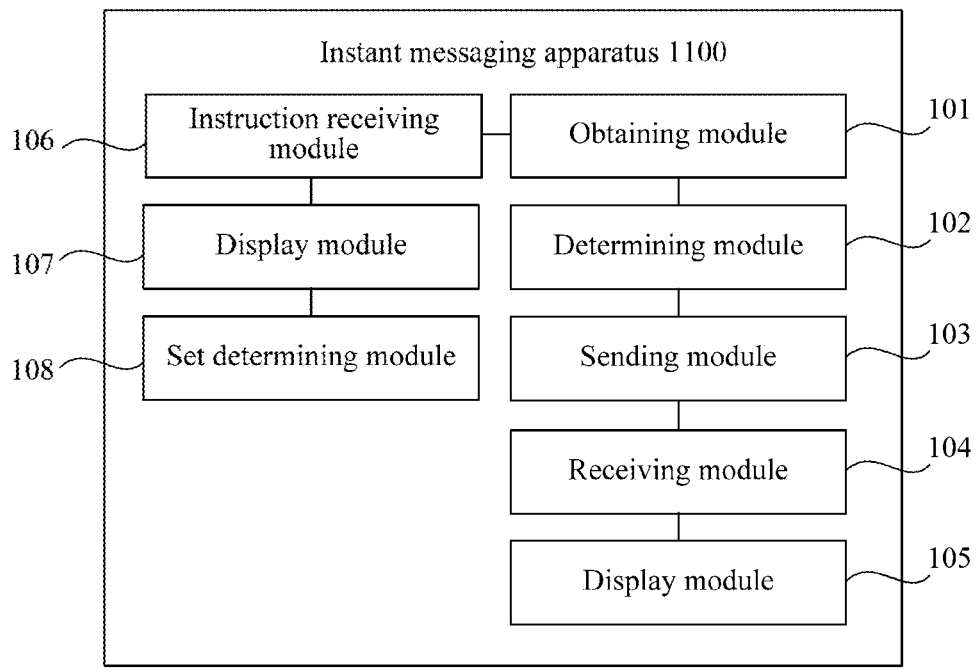
FIG. 11 is a block diagram of an instant messaging apparatus 1100 according to an embodiment of this application.

Referring to FIG. 11, in another embodiment of this application, another instant messaging apparatus 1100 is provided. The apparatus is based on the embodiment structure in FIG. 10, and further includes an instruction receiving module 106, a display module 107, and a set determining module 108.

The instruction receiving module 106 is configured to receive a decoration replacement instruction.

The obtaining module 101 is further configured to obtain an identifier of a target decorative slice data set indicated by the decoration replacement instruction received by the instruction receiving module 106.

The sending module 103 is further configured to send a role replacement request to the server, the role replacement request carrying the identifier of the target decorative slice data set and an identifier of a local user currently performing instant messaging that are obtained by the obtaining module 101, so that the server generates a replacement virtual role based on the target decorative slice data set, and determines the replacement virtual role as a virtual role corresponding to the local user currently performing instant messaging.

The display module 107 is configured to display a motion purchase interface according to a received motion purchase instruction, the motion purchase interface including at least one motion option.

The instruction receiving module 106 is configured to receive a designated motion purchase instruction, the designated motion purchase instruction being triggered when any one of the at least one motion option is selected.

The display module 107 is further configured to display a purchase interface according to the designated motion purchase instruction.

The set determining module 108 is configured to determine, after receiving a payment instruction for the selected motion option on the purchase interface, that a motion data set indicated by the designated motion purchase instruction is an available motion data set.

The sending module 103 is configured to determine whether the target motion data set is the available motion data set, and send the motion display request to the server when the target motion data set is the available motion data set.

Based on the above, the instant messaging apparatus provided in this embodiment obtains, after receiving a motion display instruction, an identifier of a target virtual role and an identifier of a target motion data set, the identifier of the target virtual role corresponding to a target user in users currently performing instant messaging, sends the identifier of the target virtual role and the identifier of the target motion data set to a server, so that the server returns the target virtual role and the target motion data set, and may display the target virtual role based on the target motion data set, to separate a virtual role image from an executed motion, thereby greatly increasing motion types that can be executed by the virtual role, and enriching the display effect of the virtual role motion.

Figure 12:
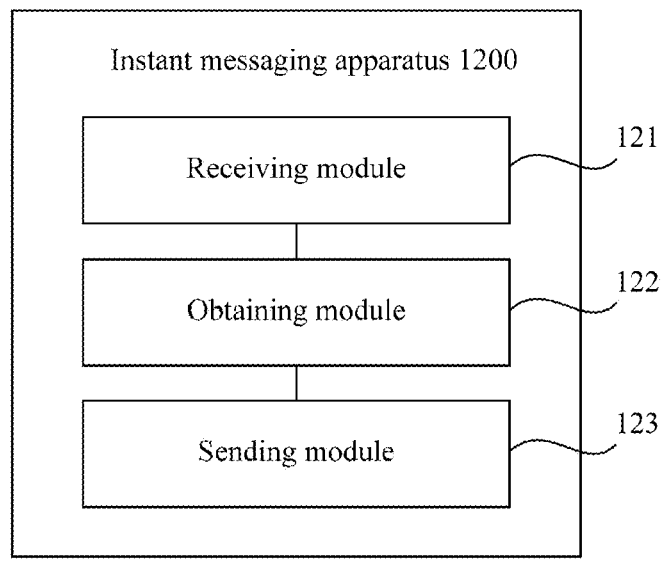
FIG. 12 is a block diagram of an instant messaging apparatus 1200 according to an embodiment of this application.

FIG. 12 is a block diagram of an instant messaging apparatus 1200 according to an exemplary embodiment. Referring to FIG. 12, the apparatus includes: a receiving module 121, an obtaining module 122, and a sending module 123.

The receiving module 121 is configured to receive a motion display request, the motion display request carrying an identifier of a target virtual role and an identifier of a target motion data set that are sent by a first client, the identifier of the target motion data set being indicated by a motion display instruction received by the first client, the target virtual role being a virtual role corresponding to a target user, the target user being at least one user in users currently performing instant messaging, and the first client being a client to which a certain user in the users currently performing instant messaging logs in.

The obtaining module 122 is configured to obtain the target motion data set according to the identifier of the target motion data set.

The obtaining module 122 is further configured to obtain the target virtual role according to the identifier of the target virtual role.

The sending module 123 is configured to send the target motion data set and the target virtual role that are obtained by the obtaining module 122 to at least one client in designated clients corresponding to the users currently performing instant messaging, so that the at least one client in the designated clients displays the target virtual role based on the target motion data set.

In an embodiment of this application, the target motion data set is formed by n target motion data subsets, and n is greater than 1; the receiving module 121 is further configured to receive subset dividing information sent by the first client, the subset dividing information including an identifier of a target motion data subset corresponding to each target virtual role, and the subset dividing information being obtained by the first client when the received motion display instruction indicates that the number of the target users is greater than 1.

The sending module 123 is further configured to send the subset dividing information received by the receiving module 121 to the at least one client in the designated clients, so that the at least one client in the designated clients displays each target virtual role, and each target virtual role moves based on the target motion data subset corresponding to each target virtual role.

Figure 13:
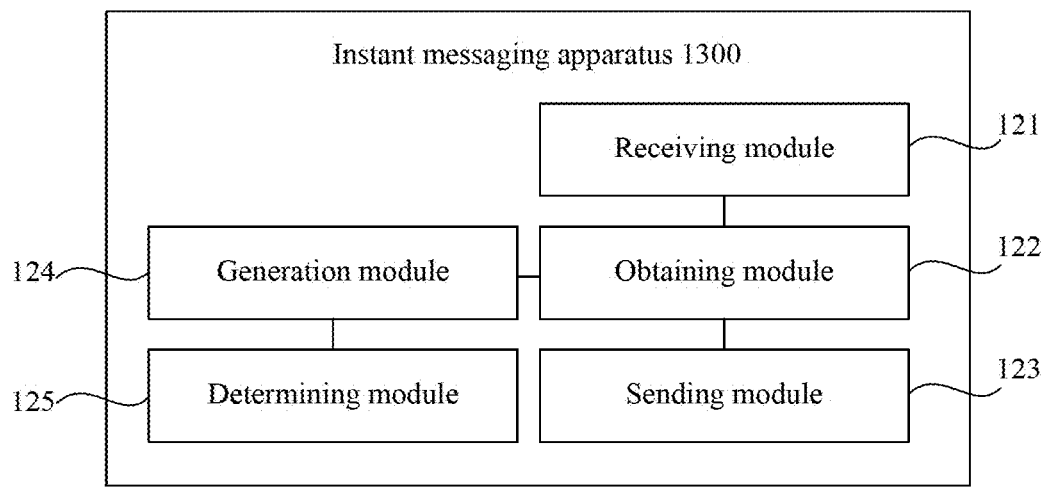
FIG. 13 is a block diagram of an instant messaging apparatus 1300 according to an embodiment of this application.

Referring to FIG. 13, in another embodiment of this application, another instant messaging apparatus 1300 is provided. The apparatus is based on the embodiment structure in FIG. 12, and further includes a generation module 124, and a determining module 125.

The receiving module 121 is further configured to receive a role replacement request sent by the first client, the role replacement request carrying an identifier of a target decorative slice data set and a user identifier of the certain user.

The obtaining module 122 is further configured to obtain the target decorative slice data set according to the identifier of the target decorative slice data set.

The generation module 124 is configured to generate a replacement virtual role based on the target decorative slice data set obtained by the obtaining module 122.

The determining module 125 is configured to determine the replacement virtual role generated by the generation module 124 as a virtual role corresponding to the certain user.

Based on the above, the instant messaging apparatus provided in this embodiment obtains, after receiving a motion display instruction, a target virtual role and a target motion data set according to the motion display instruction, and sends the target virtual role and the target motion data set to at least one client in designated clients corresponding to users currently performing instant messaging, so that the at least one client in the designated clients displays the target virtual role based on the target motion data set, to separate a virtual role image from an executed motion, thereby greatly increasing motion types that can be executed by the virtual role, and enriching the display effect of the virtual role motion.

Figure 14:
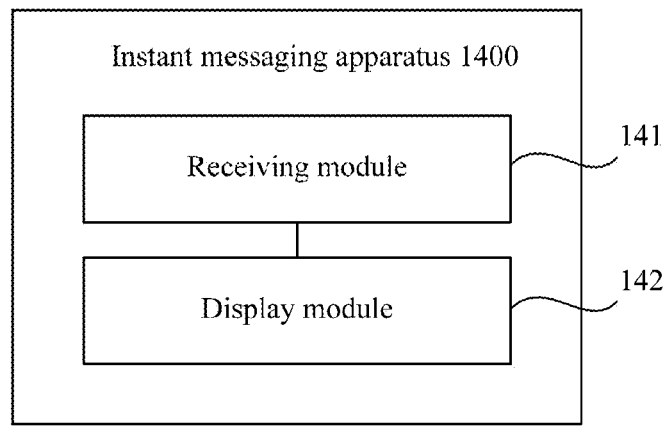
FIG. 14 is a block diagram of an instant messaging apparatus 1400 according to an embodiment of this application.

FIG. 14 is a block diagram of an instant messaging apparatus 1400 according to an exemplary embodiment. Referring to FIG. 14, the apparatus includes a receiving module 141 and a display module 142.

The receiving module 141 is configured to receive a target motion data set and a target virtual role that are sent by a server, the target motion data set being obtained by the server according to an identifier of the target motion data set in a motion display request, the target virtual role being obtained by the server according to an identifier of the target virtual role in the motion display request, the motion display request being sent to the server after a first client receives a motion display instruction and obtains the identifier of the target virtual role and the identifier of the target motion data set, the motion display instruction indicating the identifier of the target motion data set, and the first client being a client to which a certain user in users currently performing instant messaging logs in.

The display module 142 is configured to display the target virtual role received by the receiving module 141, the target virtual role moving based on the target motion data set received by the receiving module 141 during a display process.

In an embodiment of this application, the target motion data set is formed by n target motion data subsets, and n is greater than 1; the receiving module 141 is further configured to receive subset dividing information sent by the server, the subset dividing information including an identifier of a target motion data subset corresponding to each target virtual role, and the subset dividing information being obtained by the first client when the received motion display instruction indicates that the number of the target users is greater than 1.

The display module 142 is configured to display each target virtual role, each target virtual role moving based on the target motion data subset corresponding to each target virtual role during the display process.

In an embodiment of this application, the target virtual role includes a plurality of skeletal parts, and the target motion data set includes motion data of at least one skeletal part.

The display module 142 is configured to display the target virtual role, the target virtual role moving based on the motion data of the skeletal part in the target motion data set during the display process.

In an embodiment of this application, the plurality of skeletal parts include a headgear part, a left part of hair, a right part of the hair, a front part of the hair, a back part of the hair, an eye part, a glasses part, a mouth part, a head part, a back part, a right upper arm part, a right lower arm part, a left upper arm part, a left lower arm part, a belt part, an upper garment item part, a pants front piece part, a pants left piece part, a pants right piece part, a skirt part, and a tail part.

In an embodiment of this application, the target virtual role includes a plurality of decorative slices corresponding to the plurality of skeletal parts and used for decorating the corresponding skeletal parts.

The display module 142 is configured to display the target virtual role, the plurality of decorative slices of the target virtual role moving based on the motion data of the skeletal parts corresponding to the plurality of decorative slices during the display process.

Based on the above, the instant messaging apparatus provided in this embodiment receives a target motion data set and a target virtual role, and displays the target virtual role based on the target motion data set, to separate a virtual role image from an executed motion, thereby greatly increasing motion types that can be executed by the virtual role, and enriching the display effect of the virtual role motion.

It needs to be noted that, when the instant messaging apparatus provided in the foregoing embodiments performs instant messaging, divisions of the foregoing functional modules are described by using an example. In application, the foregoing functions may be allocated to and completed by different functional modules according to requirements, that is, the internal structure of the apparatus is divided into different functional modules, to complete all or some of the foregoing described functions. In addition, the instant messaging apparatus provided in the foregoing embodiments belongs to the same concept as the embodiments of the instant messaging method. For an exemplary implementation process of the instant messaging apparatus, refer to the method embodiments, and details are not described herein again.

Figure 15:
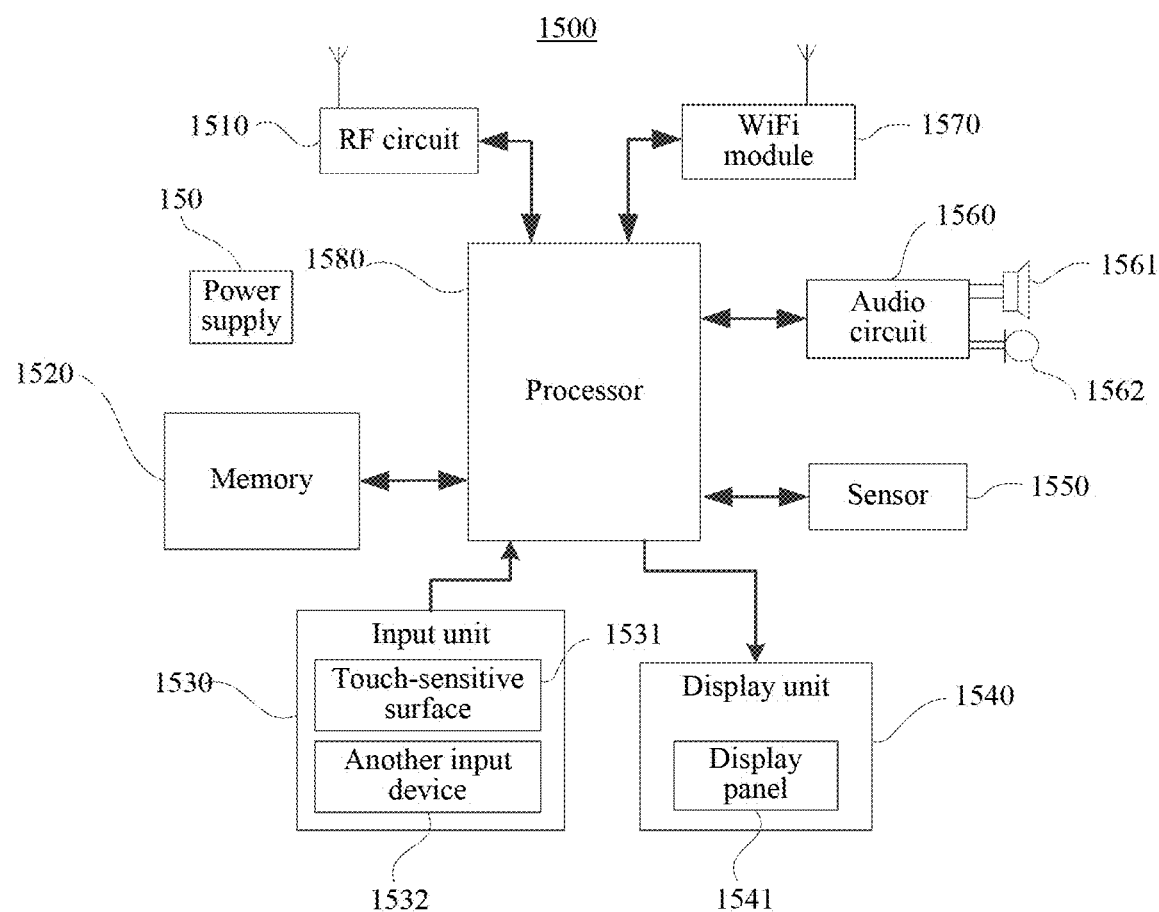
FIG. 15 is a schematic structural diagram of a terminal 1500 according to an embodiment of this application.

This embodiment provides a terminal, and this terminal may be configured to perform the instant messaging method provided in the foregoing embodiments. Referring to FIG. 15, the terminal 1500 includes:

The terminal 1500 may include components such as a radio frequency (RF) circuit 1510, a memory 1520 including one or more computer readable storage media, an input unit 1530, a display unit 1540, a sensor 1550, an audio circuit 1560, a wireless fidelity (WiFi) module 1570, a processor 1580 including one or more processing cores, and a power supply 150. Persons skilled in the technology may understand that the structure of the terminal shown in FIG. 15 does not constitute a limitation to the terminal, and the terminal may include more or fewer components than those shown in the figure, or some components may be combined, or a different component deployment may be used.

The RF circuit 1510 may be configured to receive and send signals during information receiving and sending or during a call. Particularly, the RF circuit 1510 receives downlink information from a base station, then delivers the downlink information to one or more processors 1580 for processing, and sends related uplink data to the base station. Generally, the RF circuit 1510 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 1510 may also communicate with a network and another device by radio communications. The radio communications may use any communication standard or protocol, including but not limited to Global System for Mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 1520 may be configured to store a software program and module. The processor 1580 runs the software program and module stored in the memory 1520, to implement various functional applications and data processing. The memory 1520 may mainly include a program storage area and a data storage area. The program storage area may store an operating system, an application program required by at least one function (such as a sound playback function and an image display function), and the like. The data storage area may store data (such as audio data and an address book) created according to use of the terminal 1500, and the like. In addition, the memory 1520 may include a high speed random access memory, and may further include a non-volatile memory, such as at least one magnetic disk storage device, a flash memory, or another volatile solid-state storage device. Correspondingly, the memory 1520 may further include a memory controller, to provide access of the processor 1580 and the input unit 1530 to the memory 1520.

The input unit 1530 may be configured to receive input digit or character information, and generate a keyboard, mouse, joystick, optical or track ball signal input related to the user setting and function control. Specifically, the input unit 1530 may include a touch-sensitive surface 1531 and another input device 1532. The touch-sensitive surface 1531, which may also be referred to as a touchscreen or a touch panel, may collect a touch operation of a user on or near the touch-sensitive surface (such as an operation of a user on or near the touch-sensitive surface 1531 by using any suitable object or accessory, such as a finger or a stylus), and drive a corresponding connection apparatus according to a preset program. Optionally, the touch-sensitive surface 1531 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 1580. Moreover, the touch controller can receive and execute a command sent by the processor 1580. In addition, the touch-sensitive surface 1531 may be a resistive, capacitive, infrared, or surface sound wave type touch-sensitive surface. In addition to the touch-sensitive surface 1531, the input unit 1530 may further include the another input device 1532. Specifically, the another input device 1532 may include, but is not limited to: one or more of a physical keyboard, a functional key (such as a volume control key or a switch key), a track ball, a mouse, and a joystick.

The display unit 1540 may be configured to display information input by the user or information provided for the user, and various graphical user interfaces of the terminal 1500. The graphical user interfaces may be composed of graphics, text, icons, videos, and any combination thereof. The display unit 1540 may include a display panel 1541. Optionally, the display panel 1541 may be configured by using a liquid crystal display (LCD), an organic light-emitting diode (OLED), or the like. Further, the touch-sensitive surface 1531 may cover the display panel 1541. After detecting a touch operation on or near the touch-sensitive surface 1531, the touch-sensitive surface 1531 transfers the touch operation to the processor 1580, to determine the type of the touch event. Then, the processor 1580 provides a corresponding visual output on the display panel 1541 according to the type of the touch event. Although, in FIG. 15, the touch-sensitive surface 1531 and the display panel 1541 are used as two separate parts to implement input and output functions, in some embodiments, the touch-sensitive surface 1531 and the display panel 1541 may be integrated to implement the input and output functions.

The terminal 1500 may further include at least one sensor 1550 such as an optical sensor, a motion sensor, and other sensors. Specifically, the optical sensor may include an ambient light sensor and a proximity sensor. The ambient light sensor may adjust luminance of the display panel 1541 according to brightness of the ambient light. The proximity sensor may switch off the display panel 1541 and/or backlight when the terminal 1500 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the terminal 1500, are not described in detail herein.

The audio circuit 1560, a speaker 1561, and a microphone 1562 may provide audio interfaces between the user and the terminal 1500. The audio circuit 1560 may convert received audio data into an electric signal and transmit the electric signal to the speaker 1561. The speaker 1561 converts the electric signal into a sound signal for output. On the other hand, the microphone 1562 converts a collected sound signal into an electric signal. The audio circuit 1560 receives the electric signal and converts the electric signal into audio data, and outputs the audio data to the processor 1580 for processing. Then, the processor 180 sends the audio data to, for example, another terminal by using the RF circuit 1510, or outputs the audio data to the memory 1520 for further processing. The audio circuit 1560 may further include an earplug jack, to provide communication between a peripheral earphone and the terminal 1500.

WiFi is a short distance wireless transmission technology. The terminal 1500 may help, by using the WiFi module 1570, the user to receive and send emails, browse a web page, access streaming media, and so on, which provides wireless broadband Internet access for the user. Although FIG. 15 shows the WiFi module 1570, it may be understood that the WiFi module 1570 is not a necessary component of the terminal 1500, and when required, the WiFi module 1570 may be omitted as long as the scope of the essence of the present disclosure is not changed.

The processor 1580 is a control center of the terminal 1500, which is connected to various parts of the entire mobile phone by using various interfaces and lines, and by running or executing a software program and/or module stored in the memory 1520 and calling data stored in the memory 1520, to perform various functions of the terminal 1500 and process data, so as to perform overall monitoring on the mobile phone. Optionally, the processor 1580 may include one or more processor cores. Preferably, the processor 1580 may integrate an application processor and a modem processor. The application processor mainly processes an operating system, a user interface, an application program, and the like. The modem processor mainly processes radio communications. It may be understood that the foregoing modem processor may alternatively not be integrated into the processor 1580.

The terminal 1500 further includes the power supply 150 (such as a battery) for supplying power to the components. Preferably, the power supply may be logically connected to the processor 1580 by using a power management system, thereby implementing functions such as charging, discharging, and power consumption management by using the power management system. The power supply 150 may further include one or more of a direct current or alternating current power supply, a re-charging system, a power failure detection circuit, a power supply converter or inverter, a power supply state indicator, and any other components.

Although not shown in the figure, the terminal 1500 may further include a camera, a Bluetooth module, and the like, which are not described herein. Specifically, in this embodiment, the display unit of the terminal is a touch screen display. The terminal further includes a memory and one or more programs. The one or more programs are stored in the memory and configured to be executed by one or more processors. The one or more programs include instructions for performing the following operations: obtaining, after receiving a motion display instruction, an identifier of a target motion data set indicated by the motion display instruction; determining, according to the motion display instruction, a target user in users currently performing instant messaging; obtaining an identifier of a target virtual role corresponding to the target user; sending a motion display request to a server, the motion display request carrying the identifier of the target virtual role and the identifier of the target motion data set, so that the server sends the target motion data set and the target virtual role to at least one client in designated clients corresponding to the users currently performing instant messaging; receiving the target motion data set and the target virtual role that are sent by the server; and displaying the target virtual role, the target virtual role moving based on the target motion data set during a display process.

Alternatively, the one or more programs include instructions for performing the following operations: receiving a target motion data set and a target virtual role that are sent by a server, the target motion data set being obtained by the server according to an identifier of the target motion data set in a motion display request, the target virtual role being obtained by the server according to an identifier of the target virtual role in the motion display request, the motion display request being sent to the server after a first client receives a motion display instruction and obtains the identifier of the target virtual role and the identifier of the target motion data set, the motion display instruction indicating the identifier of the target motion data set, and the first client being a client to which a certain user in users currently performing instant messaging logs in.

Figure 16:
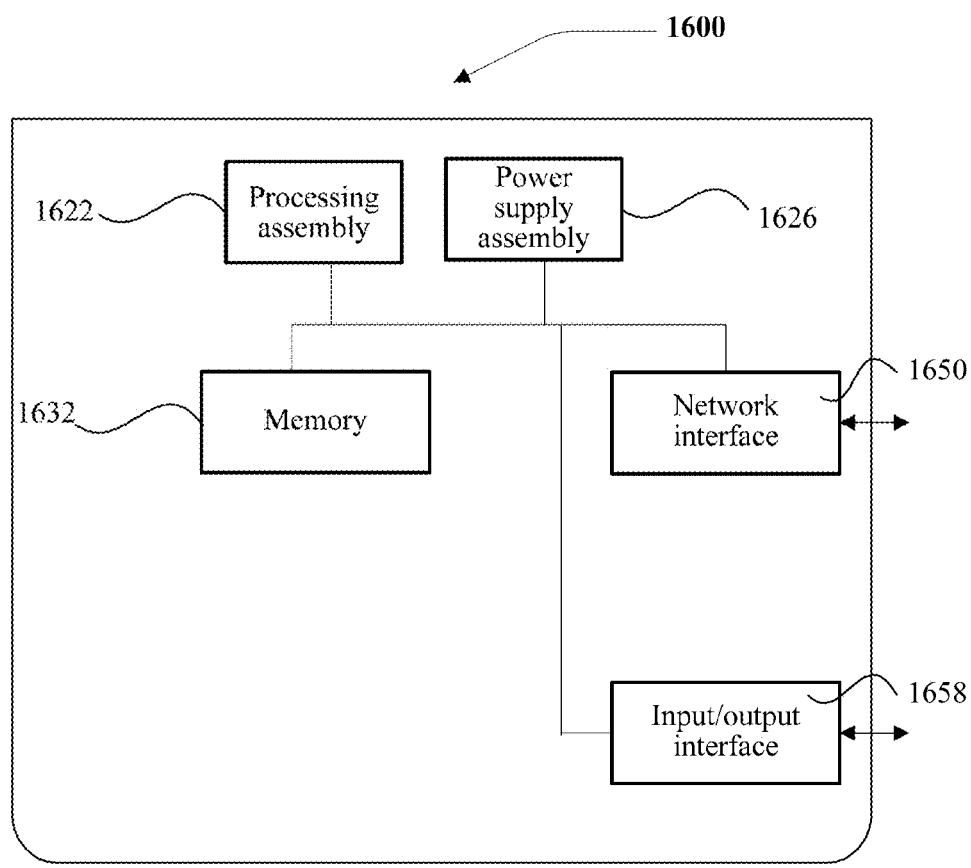
FIG. 16 is a block diagram of an instant messaging apparatus 1600 according to an embodiment of this application.

FIG. 16 is a block diagram of an instant messaging apparatus 1600 according to an exemplary embodiment. For example, the apparatus 1600 may be provided as a server. Referring to FIG. 16, the apparatus 1600 includes a processing assembly 1622, the processing assembly 1622 further including one or more processors, and a memory resource represented by a memory 1632, the memory resource being used for storing instructions, for example, an application program, that can be executed by the processing assembly 1622. The application program stored in the memory 1632 may include one or more modules each of which corresponding to a set of instructions. In addition, the processing assembly 1622 is configured to execute instructions to perform the following method: receiving a motion display request, the motion display request carrying an identifier of a target virtual role and an identifier of a target motion data set that are sent by a first client, the identifier of the target motion data set being indicated by a motion display instruction received by the first client, the target virtual role being a virtual role corresponding to a target user, the target user being at least one user in users currently performing instant messaging, and the first client being a client to which a certain user in the users currently performing instant messaging logs in; obtaining the target motion data set according to the identifier of the target motion data set; obtaining the target virtual role according to the identifier of the target virtual role; and sending the target motion data set and the target virtual role to at least one client in designated clients corresponding to the users currently performing instant messaging, so that the at least one client in the designated clients displays the target virtual role based on the target motion data set.

The apparatus 1600 may further include a power supply assembly 1626, configured to perform power supply management of the apparatus 1600, a wired or wireless network interface 1650, configured to connect the apparatus 1600 to a network, and an input/output (I/O) interface 1658. The apparatus 1600 may operate an operating system stored in the memory 1632, for example, Windows Server™, Mac OS X™, Unix™, Linux™, or Free BSD™.

A person of ordinary skill in the art may understand that all or some of the steps of the foregoing embodiments may be implemented by using hardware, or may be implemented by a program instructing relevant hardware. The program may be stored in a computer readable storage medium such as a non-transitory computer-readable storage medium. The storage medium may be a read-only memory, a magnetic disk, an optical disc, or the like.

The above descriptions are merely embodiments of this application, and it should be noted that, a person of ordinary skill in the art may make various improvements and refinements without departing from the spirit of this application. All such modifications and refinements shall fall within the protection scope of this application.

What is claimed is:

1. An instant messaging method, comprising:
   outputting at least one motion option to a client for selection via a first motion selection interface;
   adding a motion option of the at least motion option that is selected by a user of the client via the first motion selection interface to motion options available to the user to apply to a target virtual role that is user customizable;
   receiving, by circuitry of a server, a motion display request from the client, the motion display request including (i) an identifier of the target virtual role and (ii) an identifier of a target motion data set, the identifier of the target motion data set being associated with the added motion option when the added motion option is selected by the user via a second motion selection interface for the motion options available to the user, the target virtual role corresponding to a target user selected from a plurality of instant messaging users, and the client being a client to which the user of the instant messaging users logs in;
   obtaining, by the circuitry, the target motion data set according to the identifier of the target motion data set;
   obtaining, by the circuitry, the target virtual role according to the identifier of the target virtual role; and
   sending the target motion data set and the target virtual role to at least one client of a plurality of clients corresponding to the instant messaging users, the at least one client of the clients displays the target virtual role based on the target motion data set.

2. The method according to claim 1, wherein the target motion data set is formed by n target motion data subsets, n being greater than 1, and the method further comprises:
   receiving subset dividing information from the client, the subset dividing information including an identifier of a target motion data subset corresponding to each target virtual role, and the subset dividing information being received when the received motion display instruction indicates that a number of target users is greater than 1; and
   sending the subset dividing information to the at least one client of the clients, the at least one client of the clients displays each target virtual role, and each target virtual role moves based on the target motion data subset corresponding to the respective target virtual role.

3. The method according to claim 1, wherein before the receiving the motion display request, the method further comprises:
   receiving a role replacement request from the client, the role replacement request including an identifier of a target decorative slice data set and a user identifier of the user;
   obtaining the target decorative slice data set according to the identifier of the target decorative slice data set;
   generating a replacement virtual role based on the target decorative slice data set; and
   determining the replacement virtual role as a virtual role corresponding to the user.

4. The method according to claim 1, wherein the target virtual role is an animated sticker that is animated according to the target motion data set.

5. An instant messaging apparatus, comprising:
   processing circuitry configured to
      output at least one motion option to a client for selection via a first motion selection interface;
      add a motion option of the at least motion option that is selected by a user of the client via the first motion selection interface to motion options available to the user to apply to a target virtual role that is user customizable;
      receive a motion display request from the client, the motion display request including (i) an identifier of the target virtual role and (ii) an identifier of a target motion data set, the identifier of the target motion data set being associated with the added motion option when the added motion option is selected by the user via a second motion selection interface for the motion options available to the user, the target virtual role corresponding to a target user selected from a plurality of instant messaging users, and the client being a client to which the user of the instant messaging users logs in;
      obtain the target motion data set according to the identifier of the target motion data set,
      obtain the target virtual role according to the identifier of the target virtual role; and
      send the target motion data set and the target virtual role to at least one client of a plurality of clients corresponding to the instant messaging users, the at least one client of the clients displays the target virtual role based on the target motion data set.

6. The apparatus according to claim 5, wherein
the target motion data set is formed by n target motion data subsets, and n is greater than 1; and
the processing circuitry is further configured to
receive subset dividing information from the client, the subset dividing information including an identifier of a target motion data subset corresponding to each target virtual role, and the subset dividing information being received when the received motion display instruction indicates that a number of target users is greater than 1; and
send the subset dividing information to the at least one client of the clients, the at least one client of the clients displays each target virtual role, and each target virtual role moves based on the target motion data subset corresponding to the respective target virtual role.

7. The apparatus according to claim 5, wherein the processing circuitry is further configured to
receive a role replacement request from the client, the role replacement request including an identifier of a target decorative slice data set and a user identifier of the user;
obtain the target decorative slice data set according to the identifier of the target decorative slice data set;
generate a replacement virtual role based on the target decorative slice data set; and
determine the replacement virtual role as a virtual role corresponding to the user.

8. The apparatus according to claim 5, wherein the target virtual role is an animated sticker that is animated according to the target motion data set.

9. A non-transitory computer-readable medium storing a program executable by a processor to perform:
receiving, from a server, at least one motion option;
receiving a selection of a motion option of the at least one motion option by a user via a first motion selection interface;
sending selection information of the selected motion option to the server to add the selected motion option to motion options available to the user to apply to a target virtual role that is user customizable;
receiving a selection of the added motion option by the user via a second motion selection interface for the motion options available to the user;
obtaining, after receiving a motion display instruction associated with the added motion option, an identifier of a target motion data set indicated by the motion display instruction;
determining, according to the motion display instruction, a target user selected from a plurality of instant messaging users;
obtaining an identifier of the target virtual role corresponding to the selected target user;
sending a motion display request to the server, the motion display request including the identifier of the target virtual role and the identifier of the target motion data set, the target motion data set and the target virtual role being sent by the server to at least one client of a plurality of clients of the instant messaging users;
receiving the target motion data set and the target virtual role from the server; and
displaying the target virtual role, the target virtual role moving based on the target motion data set during a display process.

10. The non-transitory computer-readable medium according to claim 9, wherein
the motion display instruction indicates a number of target users, and
the determining, according to the motion display instruction, the target user of the instant messaging users includes
determining a local user currently performing instant messaging as the target user when the motion display instruction indicates that the number of the target users is 1;
determining a number of the users currently performing instant messaging as target users when the motion display instruction indicates that the number of the target users is greater than 1;
determining the users currently performing instant messaging as the target users when the number of the target users indicated by the motion display instruction is equal to the number of the instant messaging users; and
receiving a user selection instruction when the number of the target users indicated by the motion display instruction is not equal to the number of the instant messaging users, and determining a selected user indicated by the user selection instruction as the target user, the selected user being one of the instant messaging users.

11. The non-transitory computer-readable medium according to claim 9, wherein when the motion display instruction indicates that a number of target users is greater than 1, the displaying the target virtual role, the target virtual role moving based on the target motion data set during the display process comprises:
determining a target motion data subset corresponding to each target virtual role in the target motion data set, the target motion data set being formed by n target motion data subsets, and n being greater than 1; and
displaying each target virtual role, each target virtual role moving based on the target motion data subset corresponding to the respective target virtual role during the display process.

12. The non-transitory computer-readable medium according to claim 11, wherein after the determining the target motion data subset corresponding to each target virtual role in the target motion data set, the program executable by the processor further causes the processor to perform:
sending subset dividing information to the server, the subset dividing information including an identifier of the target motion data subset corresponding to each target virtual role, the subset dividing information is sent by the server to a receiving client.

13. The non-transitory computer-readable medium according to claim 11, wherein the determining the target motion data subset corresponding to each target virtual role in the target motion data set comprises:
determining the target motion data subset corresponding to each target virtual role in the target motion data set according to a received motion allocation instruction; or
determining the target motion data subset corresponding to each target virtual role in the target motion data set according to a preset allocation order.

14. The non-transitory computer-readable medium according to claim 9, wherein the target virtual role includes a plurality of skeletal parts, and the target motion data set includes motion data of at least one skeletal part; and
the displaying the target virtual role, the target virtual role moving based on the target motion data set during the display process includes displaying the target virtual role, the target virtual role moving based on the motion data of the at least one skeletal part in the target motion data set during the display process.

15. The non-transitory computer-readable medium according to claim 14, wherein the plurality of skeletal parts includes at least one of a headgear part, a left part of hair, a right part of the hair, a front part of the hair, a back part of the hair, an eye part, a glasses part, a mouth part, a head part, a back part, a right tipper arm part, a right lower arm part, a left upper arm part, a left lower arm part, a belt part, an upper garment item part, a pants front piece part, a pants left piece part, a pants right piece part, a skirt part, or a tail part.

16. The non-transitory computer-readable medium according to claim 14, wherein the target virtual role includes a plurality of decorative slices corresponding to the plurality of skeletal parts and used for decorating the corresponding skeletal parts; and
the displaying the target virtual role, the target virtual role moving based on the motion data of the at least one skeletal part in the target motion data set during the display process comprises:
displaying the target virtual role, the plurality of decorative slices of the target virtual role moving based on the motion data of the skeletal parts corresponding to the plurality of decorative slices during the display process.

17. The non-transitory computer-readable medium according to claim 9, wherein before the receiving the motion display instruction, the program executable by the processor further causes the processor to perform:
receiving a decoration replacement instruction;
obtaining an identifier of a target decorative slice data set indicated by the decoration replacement instruction; and
sending a role replacement request to the server, the role replacement request including the identifier of the target decorative slice data set and an identifier of a local user currently performing instant messaging, a replacement virtual role is generated by the server based on the target decorative slice data set, and the replacement virtual role is determined as a virtual role corresponding to the local user currently performing instant messaging.

18. The non-transitory computer-readable medium according to claim 9, wherein
the first motion selection interface is a motion purchase interface,
before the receiving the motion display instruction, the program executable by the processor further causes the processor to perform:
displaying the motion purchase interface according to a received motion purchase instruction, the motion purchase interface including the at least one motion option;
receiving a designated motion purchase instruction, the designated motion purchase instruction being triggered when the motion option of the at least one motion option is selected;
displaying a purchase interface according to the designated motion purchase instruction; and
determining, after a payment instruction for the selected motion option is received on the purchase interface, that a motion data set indicated by the designated motion purchase instruction is an available motion data set.

19. The non-transitory computer-readable medium according to claim 9, wherein the target virtual role is an animated sticker that is animated according to the target motion data set.

20. The non-transitory computer-readable medium according to claim 9, wherein the motion display instruction corresponds to a user selection of one of the motion options available to the user via the second motion selection interface of a chat interface.

* * * * *